US011498004B2

(12) United States Patent
Aonuma

(10) Patent No.: US 11,498,004 B2
(45) Date of Patent: Nov. 15, 2022

(54) COMPUTER-READABLE NON-TRANSITORY STORAGE MEDIUM HAVING INSTRUCTIONS STORED THEREIN, GAME APPARATUS, GAME SYSTEM, AND GAME PROCESSING METHOD

(71) Applicant: Nintendo Co., Ltd., Kyoto (JP)

(72) Inventor: Eiji Aonuma, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 17/330,412

(22) Filed: May 26, 2021

(65) Prior Publication Data
US 2021/0394068 A1 Dec. 23, 2021

(30) Foreign Application Priority Data

Jun. 23, 2020 (JP) .............................. JP2020-108107

(51) Int. Cl.
*A63F 13/57* (2014.01)

(52) U.S. Cl.
CPC .................... *A63F 13/57* (2014.09)

(58) Field of Classification Search
CPC ...... A63F 13/57; A63F 13/573; A63F 13/577; A63F 13/578; A63F 2300/10; A63F 2300/1006; A63F 2300/1012; A63F 2300/1037; A63F 2300/1043; A63F 2300/105; A63F 2300/1062; A63F 2300/64; A63F 2300/8005; A63F 2300/8011
See application file for complete search history.

(56) References Cited

U.S. PATENT DOCUMENTS

| 4,685,070 | A | * | 8/1987 | Flinchbaugh | ........... G06T 17/00 345/424 |
| 4,720,703 | A | * | 1/1988 | Schnarel, Jr. | ............ G09G 5/14 345/163 |
| 4,831,548 | A | * | 5/1989 | Matoba | ................ G05B 19/425 382/153 |
| 4,835,528 | A | * | 5/1989 | Flinchbaugh | ....... G06F 3/03543 345/157 |
| 4,845,643 | A | * | 7/1989 | Clapp | ..................... G06T 19/00 345/427 |

(Continued)

FOREIGN PATENT DOCUMENTS

| JP | H11-342265 A | 12/1999 |
| JP | 2001-314645 A | 11/2001 |

(Continued)

OTHER PUBLICATIONS

Office Action dated Sep. 13, 2022 in Japanese Patent Application No. 2020-108107, 9 pages.

(Continued)

*Primary Examiner* — David L Lewis
*Assistant Examiner* — Matthew D Hoel
(74) *Attorney, Agent, or Firm* — Xsensus LLP

(57) ABSTRACT

In an exemplary embodiment, on the basis of a first direction input performed on an operation device, a player object is caused to perform a posturing action of holding an item object in an orientation corresponding to an input direction according to the first direction input. Further, in accordance with cancelation of the first direction input, the player object is caused to perform a swinging action of swinging the item object.

25 Claims, 21 Drawing Sheets

(56) References Cited

U.S. PATENT DOCUMENTS

| | | | | |
|---|---|---|---|---|
| 4,855,939 A * | 8/1989 | Fitzgerald, Jr. | G06T 17/10 | 345/419 |
| 4,857,902 A * | 8/1989 | Naimark | G06F 3/033 | 345/167 |
| 5,056,031 A * | 10/1991 | Nakano | G06T 17/00 | 701/301 |
| 5,075,673 A * | 12/1991 | Yanker | G09G 5/14 | 345/163 |
| 5,157,615 A * | 10/1992 | Brodegard | G01S 13/74 | 701/301 |
| 5,261,820 A * | 11/1993 | Slye | A63F 13/10 | 463/1 |
| 5,351,966 A * | 10/1994 | Tohyama | A63F 13/52 | 463/2 |
| 5,506,949 A * | 4/1996 | Perrin | G06T 13/80 | 345/473 |
| 6,259,431 B1 * | 7/2001 | Futatsugi | A63F 13/10 | 345/157 |
| 6,267,674 B1 * | 7/2001 | Kondo | A63F 13/10 | 463/32 |
| 6,280,323 B1 * | 8/2001 | Yamazaki | A63F 13/5372 | 463/4 |
| 6,283,861 B1 * | 9/2001 | Kawai | A63F 13/10 | 463/43 |
| 6,304,267 B1 * | 10/2001 | Sata | G06T 15/10 | 345/419 |
| 6,314,426 B1 * | 11/2001 | Martin | G05G 9/047 | |
| 6,323,895 B1 * | 11/2001 | Sata | A63F 13/10 | 348/39 |
| 6,326,972 B1 * | 12/2001 | Buhler | G06T 11/001 | 345/474 |
| 6,352,476 B2 * | 3/2002 | Miyamoto | A63F 13/10 | 463/32 |
| 6,354,944 B1 * | 3/2002 | Takahashi | G06T 15/10 | 463/32 |
| 6,400,368 B1 * | 6/2002 | Laperriere | G06T 13/40 | 345/420 |
| 6,456,737 B1 * | 9/2002 | Woodfill | G01C 11/06 | 382/154 |
| 6,500,069 B1 * | 12/2002 | Ohba | A63F 13/10 | 463/31 |
| 6,503,144 B1 * | 1/2003 | Rimoto | A63F 13/10 | 463/4 |
| 6,567,072 B2 * | 5/2003 | Watanabe | G06F 3/018 | 345/161 |
| 6,626,760 B1 * | 9/2003 | Miyamoto | A63F 13/822 | 463/33 |
| 6,650,339 B1 * | 11/2003 | Silva | G06F 3/0481 | 345/619 |
| 6,699,127 B1 * | 3/2004 | Lobb | A63F 13/10 | 463/43 |
| 6,727,885 B1 * | 4/2004 | Ishino | G06F 3/0325 | 345/156 |
| 6,821,204 B2 * | 11/2004 | Aonuma | A63F 13/10 | 463/32 |
| 6,835,136 B2 * | 12/2004 | Kitao | A63F 13/10 | 463/33 |
| 6,878,065 B2 * | 4/2005 | Yamamoto | A63F 13/10 | 463/31 |
| 6,963,332 B1 * | 11/2005 | Watanabe | G06F 3/0236 | 345/161 |
| 6,966,837 B1 * | 11/2005 | Best | A63F 13/10 | 463/33 |
| 6,972,756 B1 * | 12/2005 | Yamamoto | A63F 13/837 | 345/419 |
| 6,972,776 B2 * | 12/2005 | Davis | G06F 3/0485 | 345/684 |
| 7,071,919 B2 * | 7/2006 | Hinckley | G06F 3/03543 | 345/163 |
| 7,104,890 B2 * | 9/2006 | Tsuda | A63F 13/10 | 463/30 |
| 7,151,525 B2 * | 12/2006 | McAlindon | G06F 3/0202 | 345/156 |
| 7,161,596 B2 * | 1/2007 | Hoile | G06F 3/0325 | 345/418 |
| 7,223,173 B2 * | 5/2007 | Masuyama | A63F 13/211 | 463/36 |
| 7,233,327 B2 * | 6/2007 | Isner | G06T 13/40 | 345/419 |
| 7,403,202 B1 * | 7/2008 | Nash | G06T 13/40 | 345/474 |
| 7,446,755 B1 * | 11/2008 | Goren | G06F 3/014 | 345/161 |
| 7,448,950 B2 * | 11/2008 | Matsumoto | A63F 13/10 | 463/31 |
| 7,470,195 B1 * | 12/2008 | Baldwin, III | A63F 13/10 | 463/33 |
| 7,585,224 B2 * | 9/2009 | Dyke-Wells | A63F 13/837 | 463/31 |
| 7,588,498 B2 * | 9/2009 | Iizuka | A63F 13/57 | 463/43 |
| 7,627,139 B2 * | 12/2009 | Marks | A63F 13/00 | 382/103 |
| 7,637,813 B2 * | 12/2009 | Katayama | A63F 13/573 | 463/31 |
| 7,697,015 B2 * | 4/2010 | Nishimura | A63F 13/5258 | 345/640 |
| 7,702,608 B1 * | 4/2010 | Bererton | G06K 9/00335 | 706/46 |
| 7,731,588 B2 * | 6/2010 | Templeman | G06F 3/04815 | 463/38 |
| 7,737,968 B2 * | 6/2010 | Haga | A63F 13/10 | 345/419 |
| 7,884,802 B2 * | 2/2011 | Yoshioka | G06F 3/0236 | 345/169 |
| 7,922,584 B2 * | 4/2011 | Egashira | A63F 13/833 | 463/38 |
| 7,942,745 B2 * | 5/2011 | Ikeda | A63F 13/24 | 463/38 |
| 7,952,962 B2 * | 5/2011 | Walley | G01S 13/878 | 367/124 |
| 7,963,833 B2 * | 6/2011 | Novak | A63F 13/5372 | 463/2 |
| 7,973,702 B2 * | 7/2011 | Rofougaran | G01S 13/878 | 342/146 |
| 8,031,121 B2 * | 10/2011 | Rofougaran | A63F 13/573 | 342/458 |
| 8,047,915 B2 * | 11/2011 | Lyle | A63F 13/65 | 463/31 |
| 8,062,133 B2 * | 11/2011 | Rofougaran | A63F 13/235 | 463/40 |
| 8,157,651 B2 * | 4/2012 | Ohta | A63F 13/426 | 463/37 |
| 8,160,640 B2 * | 4/2012 | Rofougaran | A63F 13/235 | 455/556.1 |
| 8,167,692 B2 * | 5/2012 | Katayama | A63F 13/92 | 463/1 |
| 8,177,642 B2 * | 5/2012 | Ikejiri | A63F 13/573 | 463/38 |
| 8,226,478 B2 * | 7/2012 | Komatsumoto | A63F 13/10 | 463/32 |
| 8,226,481 B2 * | 7/2012 | Shimamura | A63F 13/428 | 463/37 |
| 8,246,455 B2 * | 8/2012 | Kawabata | A63F 13/5255 | 463/32 |
| 8,259,112 B2 * | 9/2012 | Kuroda | A63F 13/10 | 345/427 |
| 8,277,316 B2 * | 10/2012 | Haigh-Hutchinson | A63F 13/04 | 463/31 |
| 8,282,493 B2 * | 10/2012 | Roman | F41G 1/467 | 463/51 |
| 8,289,212 B2 * | 10/2012 | Rofougaran | A63F 13/212 | 342/458 |
| 8,311,579 B2 * | 11/2012 | Rofougaran | G01S 7/412 | 455/418 |

(56) References Cited

U.S. PATENT DOCUMENTS

| | | | |
|---|---|---|---|
| 8,376,851 B2* | 2/2013 | Yamada | A63F 13/57 463/31 |
| 8,409,003 B2* | 4/2013 | Ikeda | A63F 13/06 463/37 |
| 8,465,353 B2* | 6/2013 | Ishii | A63F 13/213 463/2 |
| 8,485,902 B2* | 7/2013 | Nishimura | A63F 13/2145 345/173 |
| 8,523,677 B2* | 9/2013 | Baldwin, III | A63F 13/837 463/42 |
| 8,535,154 B2* | 9/2013 | Minato | A63F 13/5372 463/32 |
| 8,628,417 B2* | 1/2014 | Rofougaran | G06F 3/011 463/39 |
| 8,657,681 B2* | 2/2014 | Kim | A63F 13/57 463/31 |
| 8,676,257 B2* | 3/2014 | Rofougaran | A63F 13/573 455/418 |
| 8,780,043 B2* | 7/2014 | Yoshioka | A63F 13/06 345/161 |
| 8,970,602 B2* | 3/2015 | Mukai | G06T 13/20 345/473 |
| 8,998,715 B2* | 4/2015 | Sitnikau | A63F 9/24 463/31 |
| 9,086,724 B2* | 7/2015 | Sakaguchi | G06F 3/0346 |
| 9,126,115 B2* | 9/2015 | Kim | A63F 13/5375 |
| 9,208,613 B2* | 12/2015 | Mukai | G06T 13/40 |
| 9,223,786 B1* | 12/2015 | Hamrick | G06F 3/011 |
| 9,254,436 B2* | 2/2016 | Fox | A63F 13/573 |
| 9,327,191 B2* | 5/2016 | Miyamoto | A63F 13/5258 |
| 9,417,320 B2* | 8/2016 | Rofougaran | A63F 13/213 |
| 9,430,897 B2* | 8/2016 | Yates | A63F 13/60 |
| 9,523,767 B2* | 12/2016 | Rofougaran | A63F 13/212 |
| 9,547,080 B2* | 1/2017 | Rofougaran | G01S 13/426 |
| 9,761,055 B2* | 9/2017 | Miller | G02B 27/017 |
| 9,766,703 B2* | 9/2017 | Miller | A63F 13/57 |
| 9,767,616 B2* | 9/2017 | Miller | G06F 3/013 |
| 9,844,724 B2* | 12/2017 | H V | A63F 13/577 |
| 9,852,548 B2* | 12/2017 | Greco | G06F 3/011 |
| 9,881,420 B2* | 1/2018 | Miller | G06T 13/80 |
| 9,911,233 B2* | 3/2018 | O'Connor | G06V 20/20 |
| 9,911,234 B2* | 3/2018 | Miller | G06F 3/167 |
| 9,922,462 B2* | 3/2018 | Miller | A63F 13/56 |
| 9,928,654 B2* | 3/2018 | Miller | A63F 13/56 |
| 9,943,760 B2* | 4/2018 | Rofougaran | A63F 13/213 |
| 9,972,132 B2* | 5/2018 | O'Connor | G06T 7/70 |
| 9,984,506 B2* | 5/2018 | Miller | A63F 13/577 |
| 9,996,977 B2* | 6/2018 | O'Connor | G02B 27/0101 |
| 10,008,038 B2* | 6/2018 | Miller | G06F 3/011 |
| 10,013,806 B2* | 7/2018 | O'Connor | G06F 3/005 |
| 10,022,628 B1* | 7/2018 | Matsumiya | A63F 13/577 |
| 10,043,312 B2* | 8/2018 | Miller | A63F 13/57 |
| 10,109,108 B2* | 10/2018 | Miller | G02B 27/0101 |
| 10,115,232 B2* | 10/2018 | Miller | G02B 27/0101 |
| 10,115,233 B2* | 10/2018 | Miller | G02B 27/017 |
| 10,127,723 B2* | 11/2018 | Miller | G06V 20/20 |
| 10,186,085 B2* | 1/2019 | Greco | G06T 13/80 |
| 10,198,864 B2* | 2/2019 | Miller | G06V 20/20 |
| 10,262,462 B2* | 4/2019 | Miller | G06T 7/60 |
| 10,532,286 B2* | 1/2020 | Lord | A63F 13/57 |
| 10,549,195 B2* | 2/2020 | Rofougaran | G01S 7/412 |
| 10,549,196 B2* | 2/2020 | Yang | G06F 3/00 |
| 10,665,018 B2* | 5/2020 | Miller | G02B 27/0179 |
| 10,751,621 B2* | 8/2020 | Ratelle | G06T 19/20 |
| 10,780,349 B2* | 9/2020 | Hrinčar | A63F 13/85 |
| 10,825,248 B2* | 11/2020 | Miller | G06F 3/013 |
| 10,846,930 B2* | 11/2020 | Miller | G06F 3/012 |
| 10,909,760 B2* | 2/2021 | Miller | G06T 19/003 |
| 11,052,317 B1* | 7/2021 | Imamura | A63F 13/57 |
| 11,110,352 B2* | 9/2021 | Mo | G06T 17/00 |
| 11,161,041 B2* | 11/2021 | Deng | A63F 13/5258 |
| 11,205,304 B2* | 12/2021 | Miller | G06F 3/016 |
| 11,235,245 B1* | 2/2022 | Hrinčar | A63F 13/212 |
| 2001/0009867 A1* | 7/2001 | Sakaguchi | A63F 13/35 463/42 |
| 2001/0013868 A1* | 8/2001 | Nishiumi | G06F 3/038 345/427 |
| 2001/0029202 A1* | 10/2001 | Kondo | A63F 13/56 463/31 |
| 2001/0029203 A1* | 10/2001 | Shoji | A63F 13/04 463/33 |
| 2001/0040575 A1* | 11/2001 | Haga | A63F 13/005 345/473 |
| 2001/0040996 A1* | 11/2001 | Ochi | A63F 13/5258 382/154 |
| 2001/0049301 A1* | 12/2001 | Masuda | A63F 13/525 463/33 |
| 2002/0016205 A1* | 2/2002 | Nagata | A63F 13/12 463/40 |
| 2002/0022509 A1* | 2/2002 | Nicastro, II | G07F 17/3267 463/15 |
| 2002/0034979 A1* | 3/2002 | Yamamoto | A63F 13/422 463/31 |
| 2002/0085097 A1* | 7/2002 | Colmenarez | G06F 3/0304 348/211.4 |
| 2002/0119811 A1* | 8/2002 | Yabe | A63F 13/10 463/8 |
| 2002/0198047 A1* | 12/2002 | Hinami | A63F 13/52 463/32 |
| 2003/0003991 A1* | 1/2003 | Kuraishi | A63F 13/5258 463/30 |
| 2003/0109301 A1* | 6/2003 | Chudley | A63F 13/798 463/23 |
| 2003/0157985 A1* | 8/2003 | Shteyn | A63F 13/10 463/42 |
| 2003/0169280 A1* | 9/2003 | Hsieh | G06F 3/0485 345/684 |
| 2003/0190950 A1* | 10/2003 | Matsumoto | A63F 13/10 463/30 |
| 2004/0005926 A1* | 1/2004 | LeFroy | G07F 17/3288 463/42 |
| 2004/0046760 A1* | 3/2004 | Roberts | G06T 19/003 345/474 |
| 2004/0063501 A1* | 4/2004 | Shimokawa | A63F 13/10 463/49 |
| 2004/0110560 A1* | 6/2004 | Aonuma | A63F 13/10 463/32 |
| 2004/0181322 A1* | 9/2004 | Okuyama | G01C 21/20 701/21 |
| 2004/0193413 A1* | 9/2004 | Wilson | H04N 13/128 704/243 |
| 2004/0204237 A1* | 10/2004 | Miyagawa | A63F 13/10 463/30 |
| 2004/0209680 A1* | 10/2004 | Oyamada | G06T 13/40 463/31 |
| 2004/0224760 A1* | 11/2004 | Miyamoto | A63F 13/525 463/32 |
| 2004/0224761 A1* | 11/2004 | Nishimura | A63F 13/10 463/33 |
| 2005/0007261 A1* | 1/2005 | Berson | G01C 23/00 340/945 |
| 2005/0009602 A1* | 1/2005 | Nishimura | A63F 13/5258 463/30 |
| 2005/0049047 A1* | 3/2005 | Kitao | A63F 13/57 463/33 |
| 2005/0062738 A1* | 3/2005 | Handley | G06F 3/0346 345/419 |
| 2005/0107145 A1* | 5/2005 | Karashima | A63F 13/10 463/8 |
| 2005/0176502 A1* | 8/2005 | Nishimura | A63F 13/537 463/31 |
| 2005/0197188 A1* | 9/2005 | Iizuka | A63F 13/428 463/36 |
| 2005/0239547 A1* | 10/2005 | Haga | A63F 13/812 463/30 |
| 2005/0246638 A1* | 11/2005 | Whitten | A63F 13/5375 715/708 |
| 2006/0040239 A1* | 2/2006 | Cummins | G09B 9/05 434/62 |

(56) References Cited

U.S. PATENT DOCUMENTS

| | | | |
|---|---|---|---|
| 2006/0048073 A1* | 3/2006 | Jarrett | G06F 3/0485 715/784 |
| 2006/0060384 A1* | 3/2006 | Michael | E21B 10/26 175/53 |
| 2006/0084509 A1* | 4/2006 | Novak | A63F 13/837 463/49 |
| 2006/0094502 A1* | 5/2006 | Katayama | A63F 13/2145 463/31 |
| 2006/0100020 A1* | 5/2006 | Kasai | A63F 13/795 463/42 |
| 2006/0154710 A1* | 7/2006 | Serafat | A63F 13/86 463/1 |
| 2006/0154713 A1* | 7/2006 | Sunazuka | A63F 13/803 463/6 |
| 2006/0239471 A1* | 10/2006 | Mao | H04R 1/406 381/92 |
| 2006/0246968 A1* | 11/2006 | Dyke-Wells | A63F 13/10 463/1 |
| 2006/0258445 A1* | 11/2006 | Nishimori | A63F 13/10 463/30 |
| 2006/0258450 A1* | 11/2006 | Ishihata | A63F 13/833 463/31 |
| 2006/0287027 A1* | 12/2006 | Hardisty | A63F 13/42 463/8 |
| 2007/0050597 A1* | 3/2007 | Ikeda | A63F 13/213 712/1 |
| 2007/0060336 A1* | 3/2007 | Marks | A63F 13/10 463/30 |
| 2007/0060343 A1* | 3/2007 | Sakaguchi | A63F 13/5255 463/31 |
| 2007/0060384 A1* | 3/2007 | Dohta | A63F 13/06 463/43 |
| 2007/0072662 A1* | 3/2007 | Templeman | G06F 3/012 463/6 |
| 2007/0072680 A1* | 3/2007 | Ikeda | A63F 13/213 463/43 |
| 2007/0097150 A1* | 5/2007 | Ivashin | G06F 3/0485 345/660 |
| 2007/0111768 A1* | 5/2007 | Tipping | A63F 13/5375 463/6 |
| 2007/0117635 A1* | 5/2007 | Spanton | A63F 13/12 463/43 |
| 2007/0122778 A1* | 5/2007 | Beitel | G09B 5/06 434/219 |
| 2007/0132766 A1* | 6/2007 | Kim | G06T 17/00 345/473 |
| 2007/0155492 A1* | 7/2007 | Goden | G06T 1/00 463/32 |
| 2007/0171221 A1* | 7/2007 | Miyamoto | G06T 13/60 345/419 |
| 2007/0202949 A1* | 8/2007 | Kawade | A63F 13/577 463/32 |
| 2007/0254738 A1* | 11/2007 | Sato | A63F 13/06 463/31 |
| 2007/0270215 A1* | 11/2007 | Miyamoto | A63F 13/837 463/32 |
| 2007/0276709 A1* | 11/2007 | Trimby | A63F 13/00 705/6 |
| 2007/0298881 A1* | 12/2007 | Kawamura | A63F 13/10 463/33 |
| 2008/0056561 A1* | 3/2008 | Sawachi | G06K 9/32 382/154 |
| 2008/0070684 A1* | 3/2008 | Haigh-Hutchinson | A63F 13/5375 463/32 |
| 2008/0176653 A1* | 7/2008 | Kishi | G07F 17/3211 463/31 |
| 2008/0248869 A1* | 10/2008 | Umezaki | A63F 13/537 463/31 |
| 2008/0309618 A1* | 12/2008 | Okada | A63F 13/211 345/157 |
| 2008/0311989 A1* | 12/2008 | Ikeda | A63F 13/211 463/36 |
| 2008/0316085 A1* | 12/2008 | Rofougaran | G01S 13/878 342/361 |
| 2008/0316103 A1* | 12/2008 | Rofougaran | A63F 13/573 342/386 |
| 2008/0316324 A1* | 12/2008 | Rofougaran | A63F 13/212 348/222.1 |
| 2008/0316863 A1* | 12/2008 | Walley | G01S 13/878 367/135 |
| 2008/0318595 A1* | 12/2008 | Rofougaran | A63F 13/573 455/456.1 |
| 2008/0318625 A1* | 12/2008 | Rofougaran | G01S 13/426 463/16 |
| 2008/0318626 A1* | 12/2008 | Rofougaran | A63F 13/573 455/556.1 |
| 2008/0318673 A1* | 12/2008 | Rofougaran | A63F 13/213 463/29 |
| 2008/0318675 A1* | 12/2008 | Rofougaran | A63F 13/211 463/31 |
| 2008/0318680 A1* | 12/2008 | Rofougaran | G01S 7/412 463/39 |
| 2008/0318681 A1* | 12/2008 | Rofougaran | A63F 13/212 463/39 |
| 2008/0318682 A1* | 12/2008 | Rofougaran | A63F 13/211 463/39 |
| 2008/0318683 A1* | 12/2008 | Rofougaran | A63F 13/212 463/39 |
| 2008/0318684 A1* | 12/2008 | Rofougaran | G01S 13/878 342/450 |
| 2008/0318689 A1* | 12/2008 | Rofougaran | A63F 13/212 463/42 |
| 2008/0318691 A1* | 12/2008 | Rofougaran | A63F 13/212 463/40 |
| 2009/0017910 A1* | 1/2009 | Rofougaran | A63F 13/211 463/36 |
| 2009/0051623 A1* | 2/2009 | Paul | G06T 7/001 345/4 |
| 2009/0054162 A1* | 2/2009 | Utsuki | G06F 1/1607 463/53 |
| 2009/0062006 A1* | 3/2009 | Ikeda | A63F 13/211 463/37 |
| 2009/0062007 A1* | 3/2009 | Chihaya | A63F 13/533 463/42 |
| 2009/0094535 A1* | 4/2009 | Bromenshenkel | A63F 13/5375 715/757 |
| 2009/0104954 A1* | 4/2009 | Weber | G07F 17/3223 463/1 |
| 2009/0153478 A1* | 6/2009 | Kerr | H04N 5/445 345/158 |
| 2009/0176570 A1* | 7/2009 | Baldwin, III | A63F 13/837 463/33 |
| 2009/0181736 A1* | 7/2009 | Haigh-Hutchinson | A63F 13/837 463/2 |
| 2009/0191968 A1* | 7/2009 | Johnson | A63F 13/10 463/37 |
| 2009/0258706 A1* | 10/2009 | Rofougaran | G06F 3/0346 463/39 |
| 2009/0258708 A1* | 10/2009 | Figueroa | A63F 13/49 463/43 |
| 2009/0273559 A1* | 11/2009 | Rofougaran | A63F 13/211 345/156 |
| 2009/0280895 A1* | 11/2009 | Yamaoka | A63F 13/00 463/30 |
| 2009/0305787 A1* | 12/2009 | Ikejiri | A63F 13/843 463/43 |
| 2009/0326847 A1* | 12/2009 | Ohta | A63F 13/211 702/93 |
| 2009/0327723 A1* | 12/2009 | Yates | A63F 13/57 713/168 |
| 2010/0022304 A1* | 1/2010 | Katayama | A63F 13/2145 463/31 |
| 2010/0160045 A1 | 6/2010 | Yamada et al. | |
| 2010/0165215 A1* | 7/2010 | Shim | H04N 21/42204 348/734 |

(56) References Cited

U.S. PATENT DOCUMENTS

| | | | | |
|---|---|---|---|---|
| 2010/0197389 | A1* | 8/2010 | Ueda | A63F 13/12 463/30 |
| 2010/0203945 | A1* | 8/2010 | Pitocchelli | A63F 3/0421 463/19 |
| 2010/0304859 | A1* | 12/2010 | Yamada | A63F 13/2145 463/31 |
| 2011/0003632 | A1* | 1/2011 | Ansari | G07F 17/3269 463/25 |
| 2011/0065508 | A1* | 3/2011 | Ishii | A63F 13/5258 463/36 |
| 2011/0130201 | A1* | 6/2011 | Nojiri | A63F 13/42 463/31 |
| 2011/0214093 | A1* | 9/2011 | Nishimura | G06F 3/04883 715/863 |
| 2011/0312421 | A1* | 12/2011 | Rofougaran | A63F 13/235 463/40 |
| 2012/0129606 | A1* | 5/2012 | Rofougaran | A63F 13/235 463/39 |
| 2012/0190444 | A1* | 7/2012 | Fujisawa | A63F 13/67 463/31 |
| 2012/0315991 | A1* | 12/2012 | Rofougaran | A63F 13/212 463/40 |
| 2013/0023290 | A1* | 1/2013 | Rofougaran | A63F 13/212 455/552.1 |
| 2013/0196759 | A1* | 8/2013 | Kim | A63F 13/533 463/31 |
| 2013/0293538 | A1* | 11/2013 | Mukai | A63F 13/573 345/419 |
| 2013/0307850 | A1* | 11/2013 | Mukai | G06T 13/40 345/420 |
| 2014/0002456 | A1* | 1/2014 | Mizuki | A63F 13/525 345/420 |
| 2014/0024449 | A1* | 1/2014 | Fox | A63F 13/00 463/31 |
| 2014/0024452 | A1* | 1/2014 | Fujisawa | A63F 13/35 463/31 |
| 2014/0024460 | A1* | 1/2014 | Fox | A63F 13/57 463/42 |
| 2014/0141882 | A1* | 5/2014 | Kim | A63F 13/65 463/31 |
| 2015/0301592 | A1* | 10/2015 | Miller | G06F 3/013 345/156 |
| 2015/0301599 | A1* | 10/2015 | Miller | A63F 13/57 345/156 |
| 2015/0301787 | A1* | 10/2015 | Greco | G02B 27/0093 345/633 |
| 2015/0301797 | A1* | 10/2015 | Miller | G06F 3/013 345/156 |
| 2015/0302250 | A1* | 10/2015 | Miller | G06T 11/60 382/203 |
| 2015/0302625 | A1* | 10/2015 | Greco | G06T 7/60 345/633 |
| 2015/0302642 | A1* | 10/2015 | Miller | G06T 7/70 345/633 |
| 2015/0302643 | A1* | 10/2015 | Miller | G06F 3/014 345/633 |
| 2015/0302644 | A1* | 10/2015 | Miller | G06T 7/60 345/633 |
| 2015/0302652 | A1* | 10/2015 | Miller | G06Q 30/02 345/419 |
| 2015/0302655 | A1* | 10/2015 | Miller | A63F 13/56 345/633 |
| 2015/0302656 | A1* | 10/2015 | Miller | A63F 13/577 345/633 |
| 2015/0302657 | A1* | 10/2015 | Miller | G02B 27/0179 345/633 |
| 2015/0302658 | A1* | 10/2015 | O'Connor | G06F 3/014 345/633 |
| 2015/0302659 | A1* | 10/2015 | O'Connor | G06T 11/60 345/633 |
| 2015/0302660 | A1* | 10/2015 | O'Connor | G06T 11/60 345/633 |
| 2015/0302661 | A1* | 10/2015 | Miller | G06Q 30/02 345/633 |
| 2015/0302662 | A1* | 10/2015 | Miller | G06F 3/017 345/633 |
| 2015/0302663 | A1* | 10/2015 | Miller | G02B 27/0101 345/633 |
| 2015/0302664 | A1* | 10/2015 | Miller | G06F 3/167 345/633 |
| 2015/0302665 | A1* | 10/2015 | Miller | G02B 27/0093 345/419 |
| 2015/0314194 | A1* | 11/2015 | Lord | A63F 13/28 463/35 |
| 2015/0316980 | A1* | 11/2015 | Miller | G06F 3/013 345/419 |
| 2015/0316982 | A1* | 11/2015 | Miller | G06F 3/013 345/156 |
| 2015/0317839 | A1* | 11/2015 | Miller | G06T 19/006 345/633 |
| 2015/0321102 | A1* | 11/2015 | H V | A63F 13/577 463/31 |
| 2015/0339857 | A1* | 11/2015 | O'Connor | G06V 20/20 345/633 |
| 2015/0356781 | A1* | 12/2015 | Miller | G06F 3/017 345/633 |
| 2015/0356782 | A1* | 12/2015 | Miller | G06T 7/70 345/633 |
| 2015/0356783 | A1* | 12/2015 | Miller | A63F 13/56 345/633 |
| 2015/0356784 | A1* | 12/2015 | Miller | G02B 27/0179 345/633 |
| 2016/0074753 | A1* | 3/2016 | Frostberg | A63F 13/57 463/31 |
| 2016/0220907 | A1* | 8/2016 | Ikonen | A63F 13/577 |
| 2017/0061688 | A1* | 3/2017 | Miller | G06V 20/20 |
| 2017/0232345 | A1* | 8/2017 | Rofougaran | G01S 13/878 463/2 |
| 2017/0232346 | A1* | 8/2017 | Rofougaran | A63F 13/213 463/2 |
| 2018/0243653 | A1* | 8/2018 | Yang | A63F 13/55 |
| 2019/0070505 | A1* | 3/2019 | Ratelle | G06T 19/003 |
| 2019/0366215 | A1* | 12/2019 | Mo | H04N 21/25883 |
| 2020/0129861 | A1* | 4/2020 | Rofougaran | A63F 13/212 |
| 2020/0139226 | A1* | 5/2020 | Hrincár | A63F 13/57 |
| 2020/0139240 | A1* | 5/2020 | Hrincár | A63F 13/57 |
| 2020/0298121 | A1* | 9/2020 | Deng | A63F 13/57 |
| 2020/0353357 | A1* | 11/2020 | Wan | A63F 13/533 |
| 2021/0322879 | A1* | 10/2021 | Huang | A63F 13/5375 |
| 2021/0322882 | A1* | 10/2021 | Huang | A63F 13/92 |
| 2021/0370179 | A1* | 12/2021 | Sato | A63F 13/5258 |
| 2022/0080317 | A1* | 3/2022 | Shiba | A63F 13/57 |
| 2022/0105433 | A1* | 4/2022 | Hrincár | A63F 13/24 |

FOREIGN PATENT DOCUMENTS

| | | |
|---|---|---|
| JP | 2008-073184 A | 4/2008 |
| JP | 5289031 B2 | 9/2013 |
| JP | 2019-170964 A | 10/2019 |

OTHER PUBLICATIONS

Yamada Masami, "Major League Based Ball 2 K 7", "Gameside 2007.10 vol. 08," Micromagazine Co., Ltd., Oct. 1, 2007, vol. 4, No. 5, pp. 74, 75.

* cited by examiner

COORDINATE SYSTEM OF
STICK PLANE

COORDINATE SYSTEM OF PLAYER
OBJECT PLANE

Fig. 15
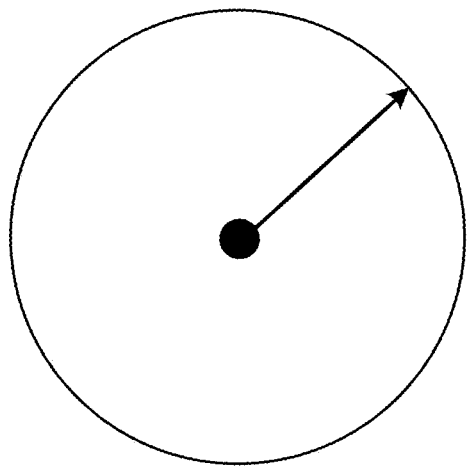 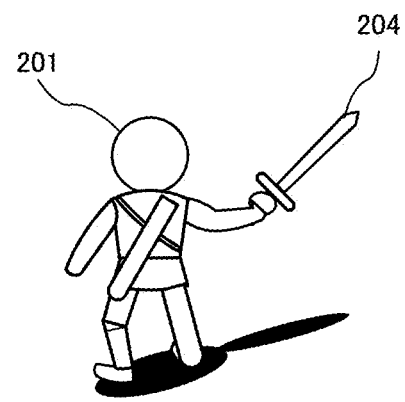
Fig. 16
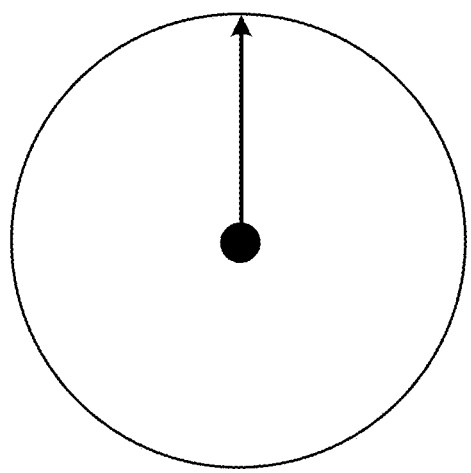 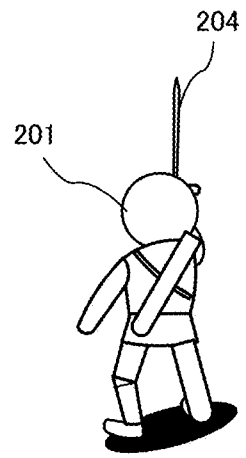

COMPUTER-READABLE NON-TRANSITORY STORAGE MEDIUM HAVING INSTRUCTIONS STORED THEREIN, GAME APPARATUS, GAME SYSTEM, AND GAME PROCESSING METHOD

CROSS REFERENCE TO RELATED APPLICATION

This application claims priority to Japanese Patent Application No. 2020-108107 filed on Jun. 23, 2020, the entire contents of which are incorporated herein by reference.

FIELD

The exemplary embodiment herein relates to game processing that causes a player object having an item object to perform a predetermined action in a virtual space.

BACKGROUND AND SUMMARY

To date, a game in which the orientation and motion of a controller are calculated on the basis of outputs of an angular velocity sensor and an acceleration sensor provided in the controller and the calculated orientation and motion are reflected in the behavior of an object in a virtual game space, is known. Specifically, a game in which the posture of holding a sword of a player object in a virtual game space is changed in accordance with the orientation of the controller, and the sword is swung in accordance with the swing direction of the controller, is known.

The above game is on an assumption that the sword is swung by moving the controller itself, and the other input methods, specifically, inputs by an analog stick, etc., are not particularly taken into consideration.

Therefore, an object of the exemplary embodiment is to provide a storage medium having stored therein instructions that can realize an action related to a sword object in a virtual game space even when a direction input by an analog stick or the like is used.

Another object is to provide a storage medium having stored therein instructions that can realize a common action whether either of two types of operations, i.e., an operation based on a direction input by an analog stick, etc., and an operation using the motion of a controller itself, is used.

Configuration examples for achieving the above objects will be shown below.

One configuration example is a computer-readable non-transitory storage medium having stored therein instructions (e.g., a game program) that, when executed by a processor of an information processing system, cause the processor to execute the following. That is, the processor controls, in a virtual space, a player object having an item object. The processor causes, on the basis of a first direction input performed on an operation device, the player object to perform a posturing action of holding the item object in an orientation corresponding to an input direction according to the first direction input. The processor further causes, in accordance with cancelation of the first direction input, the player object to perform a swinging action of swinging the item object.

According to the above configuration example, the player object can be caused to perform a series of actions from taking a posture of holding the item object to swinging the item object, through a simple operation in the form of a direction input.

As another configuration example, the instructions may cause the processor, as the swinging action, the player object to swing the item object from a direction in which the player object holds the item object in the posturing action, toward an opposite direction.

According to the above configuration example, the swing direction can be designated simply by determining a direction while taking a posture of holding the item object and then by canceling the direction input. Accordingly, when compared with a case where a direction input is directly performed in a direction in which the player desires to swing the item object, the item object can be caused to be swung more accurately in the aimed direction.

As another configuration example, the instructions may further cause the processor to perform game processing including a success determination process based on the direction in which the item object is swung in the swinging action.

According to the above configuration example, when a condition that the item object is swung in a correct direction is used in the progress of the game, more accurate direction input can be performed. Thus, the game can be advantageously advanced.

As another configuration example, the operation device may include a first stick for providing a first direction input, and may output direction input data corresponding to a tilt of the first stick. Then, the instructions may further cause the processor to: cause the player object to perform the posturing action in accordance with a tilting direction of the first stick while a tilting degree of the first stick exceeds a first reference; and cause, when a state where the tilting degree exceeds the first reference has transitioned to a state where the tilting degree does not exceed a second reference, the player object to perform the swinging action, assuming that the cancelation of the first direction input has been performed.

According to the above configuration example, when the stick is tilted at an angle that is large to some extent, and then, the tilting degree is simply reduced, the swinging action can be caused to be performed.

As another configuration example, the second reference may be a tilting degree smaller than the first reference. When the state where the tilting degree exceeds the first reference has changed to the state where the tilting degree does not exceed the second reference within a predetermined time, the swinging action may be caused to be performed, assuming that the cancelation of the first direction input has been performed.

According to the above configuration example, for example, the stick is tilted first, and then, at the timing when the finger is released, the swinging action can be caused to be performed. Accordingly, a simple operability can be provided to the player.

As another configuration example, when the tilting degree is between the first reference and the second reference, the instructions may further cause the processor to cause the player object to perform an action of moving the item object, on the basis of the tilting degree and the tilting direction.

As another configuration example, the operation device may further include a second stick for providing a second direction input, and may output direction input data corresponding to a tilt of the second stick. Then, the instructions may further cause the processor to move the player object in the virtual space on the basis of the second direction input.

According to the above configuration example, the player object can also be moved while an operation on the item object is performed. Therefore, it is possible to cause the player object to perform a variety of actions, through a simple operation.

As another configuration example, the operation device may further include an inertial sensor. Then, the instructions may further cause the processor to: in a first operation mode, cause the player object to perform the posturing action and the swinging action on the basis of the first direction input; and in a second operation mode, cause the player object to perform the posturing action on the basis of an orientation of the operation device, and cause the player object to perform the swinging action on the basis of a swing input performed on the operation device.

According to the above configuration example, for a series of actions of taking a posture of holding the item object and swinging the item object, two types of operation methods can be provided to the player.

As another configuration example, the item object may be a weapon object for attacking an enemy object by the swinging action.

According to the above configuration example, for an operation of swinging a weapon (e.g., sword) in order to attack an enemy, a simple and intuitive operation method can be provided to the player.

As another configuration example, the instructions may further cause the processor to, while an input on the operation device other than the first direction input is performed together with the first direction input, control a virtual camera on the basis of the first direction input, without causing the player object to perform the posturing action and the swinging action.

According to the above configuration example, it is possible to separately use the same operation device so as to suit the situation, between virtual camera operation and an action using the item object.

According to the exemplary embodiment, through the direction input of the analog stick or the like, an action of taking a posture of holding a sword object, and an action of swinging the sword object on the basis of the posture can be realized.

BRIEF DESCRIPTION OF THE DRAWINGS

FIG. 15 shows a non-limiting example of the posturing action;

FIG. 16 shows a non-limiting example of the posturing action;

DETAILED DESCRIPTION OF NON-LIMITING EXAMPLE EMBODIMENTS

Hereinafter, the exemplary embodiment will be described. A game system according to an example of the exemplary embodiment is described below. An example of a game system 1 according to the exemplary embodiment includes a main body apparatus (an information processing apparatus, which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
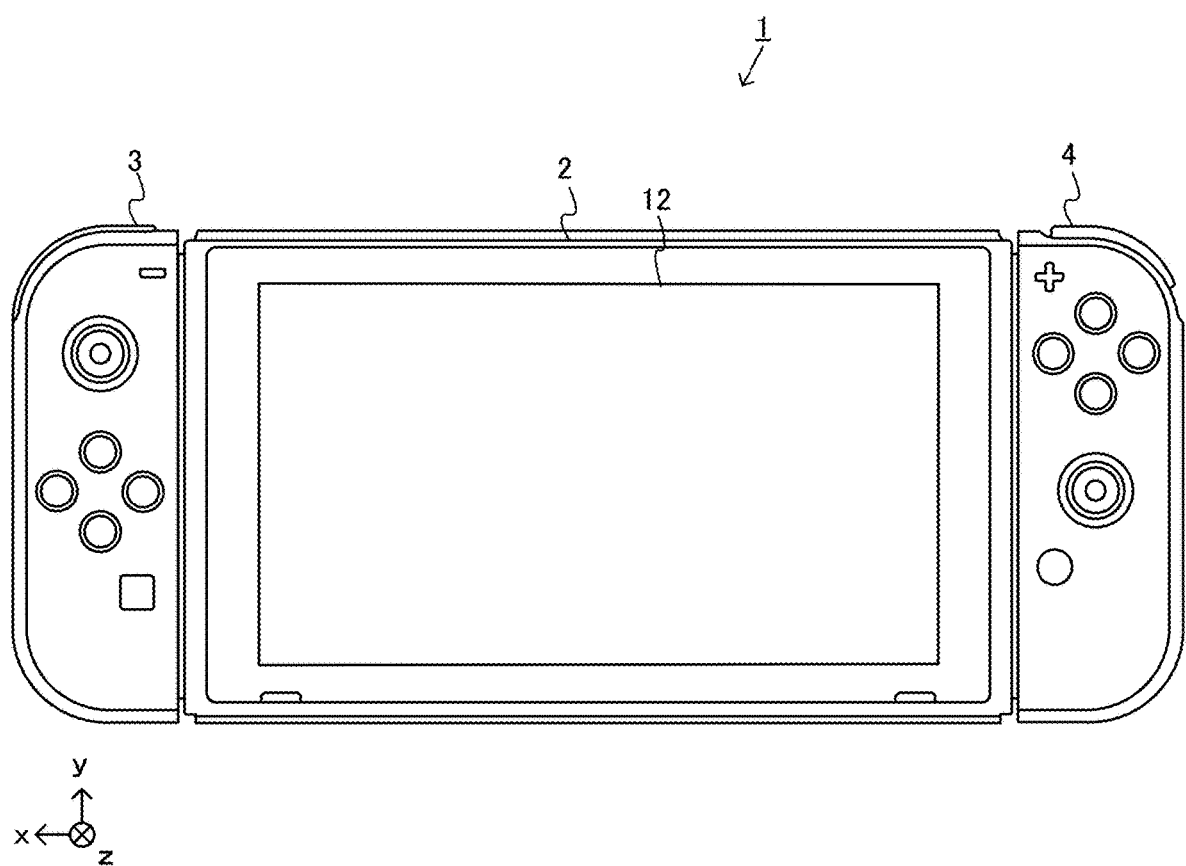
FIG. 1 shows a non-limiting example of the state where a left controller 3 and a right controller 4 are attached to a main body apparatus 2.

FIG. 1 shows an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
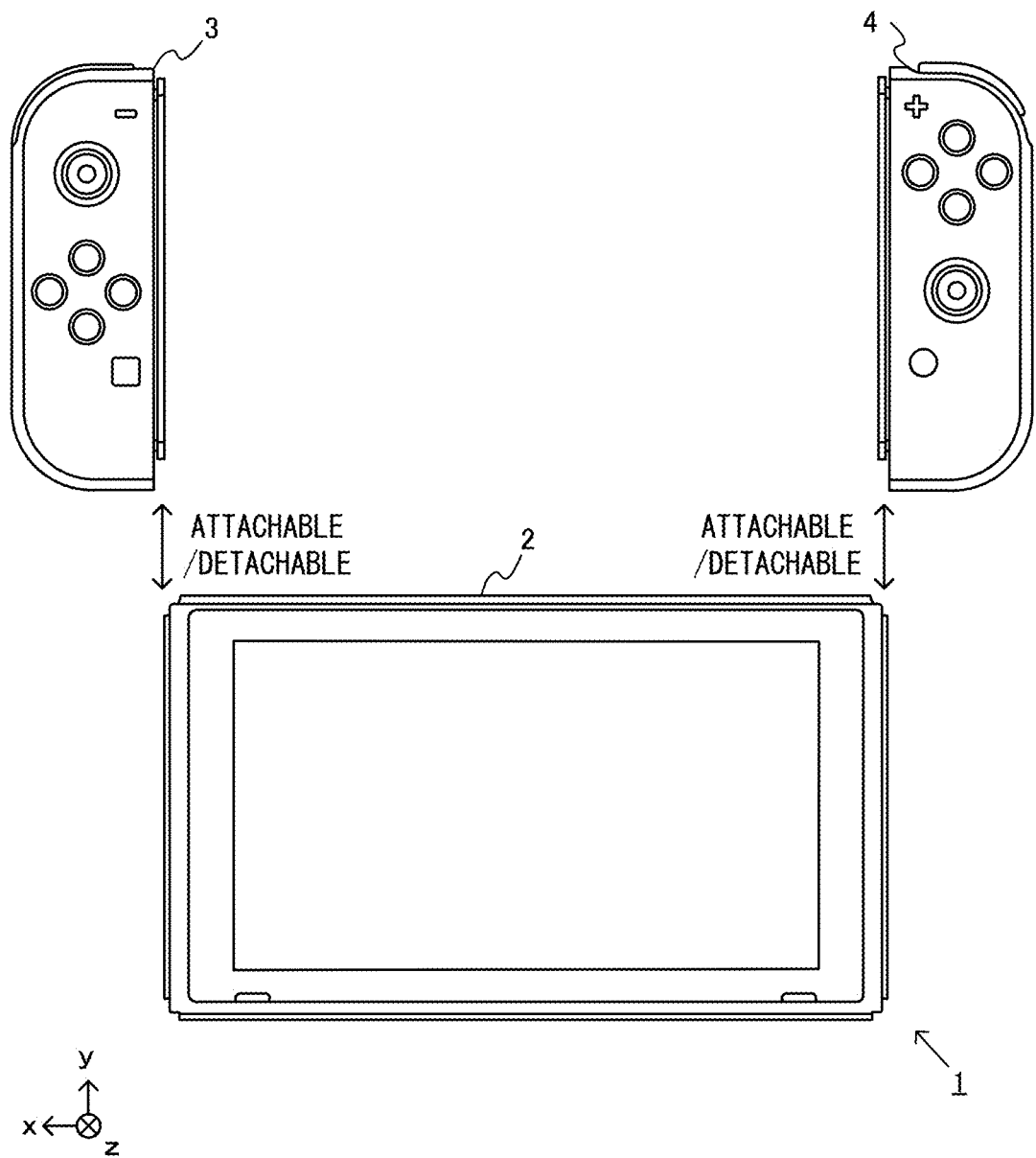
FIG. 2 shows a non-limiting example of the state where the left controller 3 and the right controller 4 are detached from the main body apparatus 2.

FIG. 2 shows an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
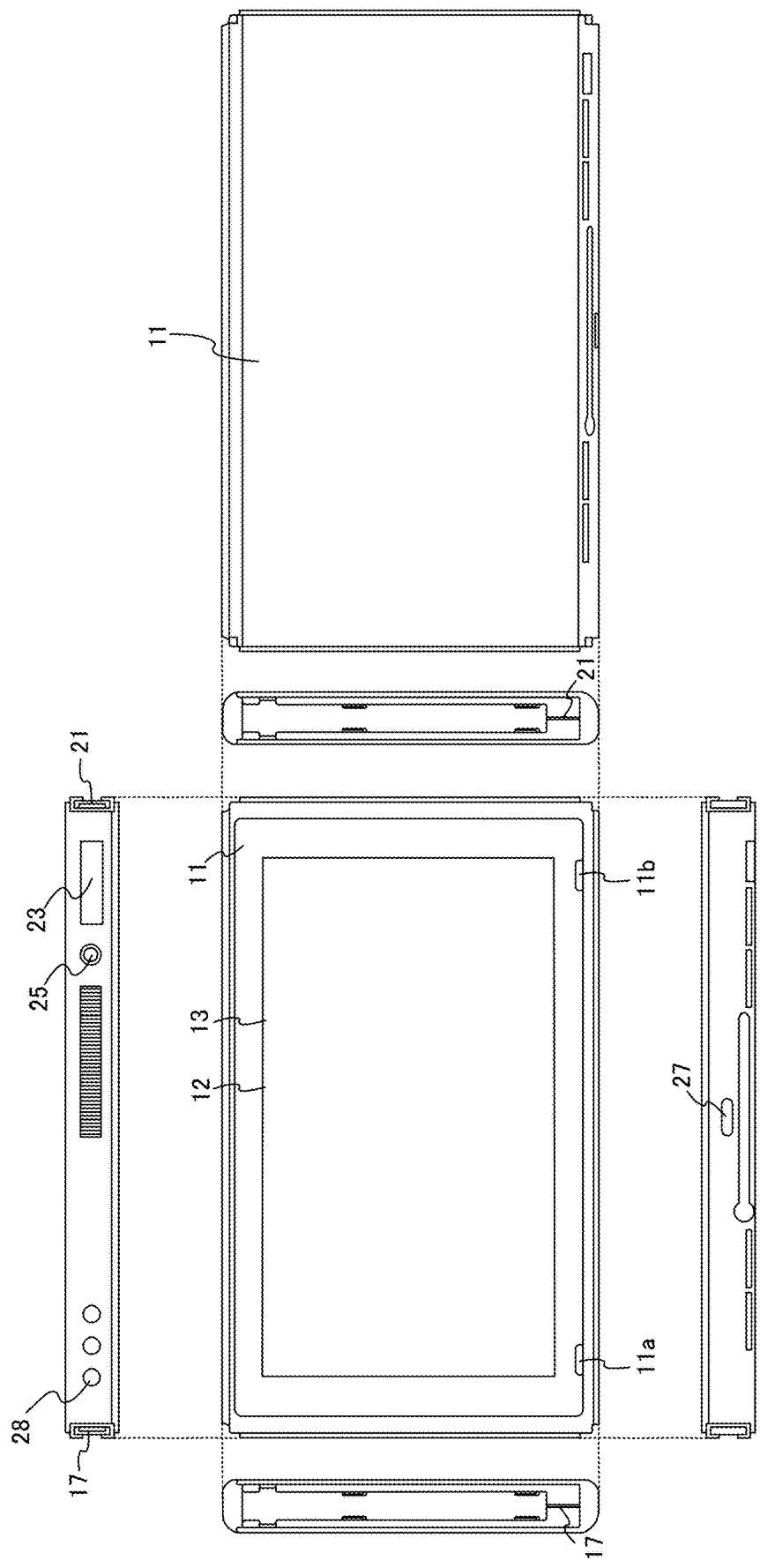
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a substantially rectangular shape.

It should be noted that the shape and the size of the housing 11 are discretionary. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

The main body apparatus 2 includes a touch panel 13 on the screen of the display 12. In the exemplary embodiment, the touch panel 13 is of a type capable of receiving a multi-touch input (e.g., electrical capacitance type). However, the touch panel 13 may be of any type, and may be, for example, of a type capable of receiving a single-touch input (e.g., resistive film type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds outputted from the speakers 88 are outputted through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and outputted from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
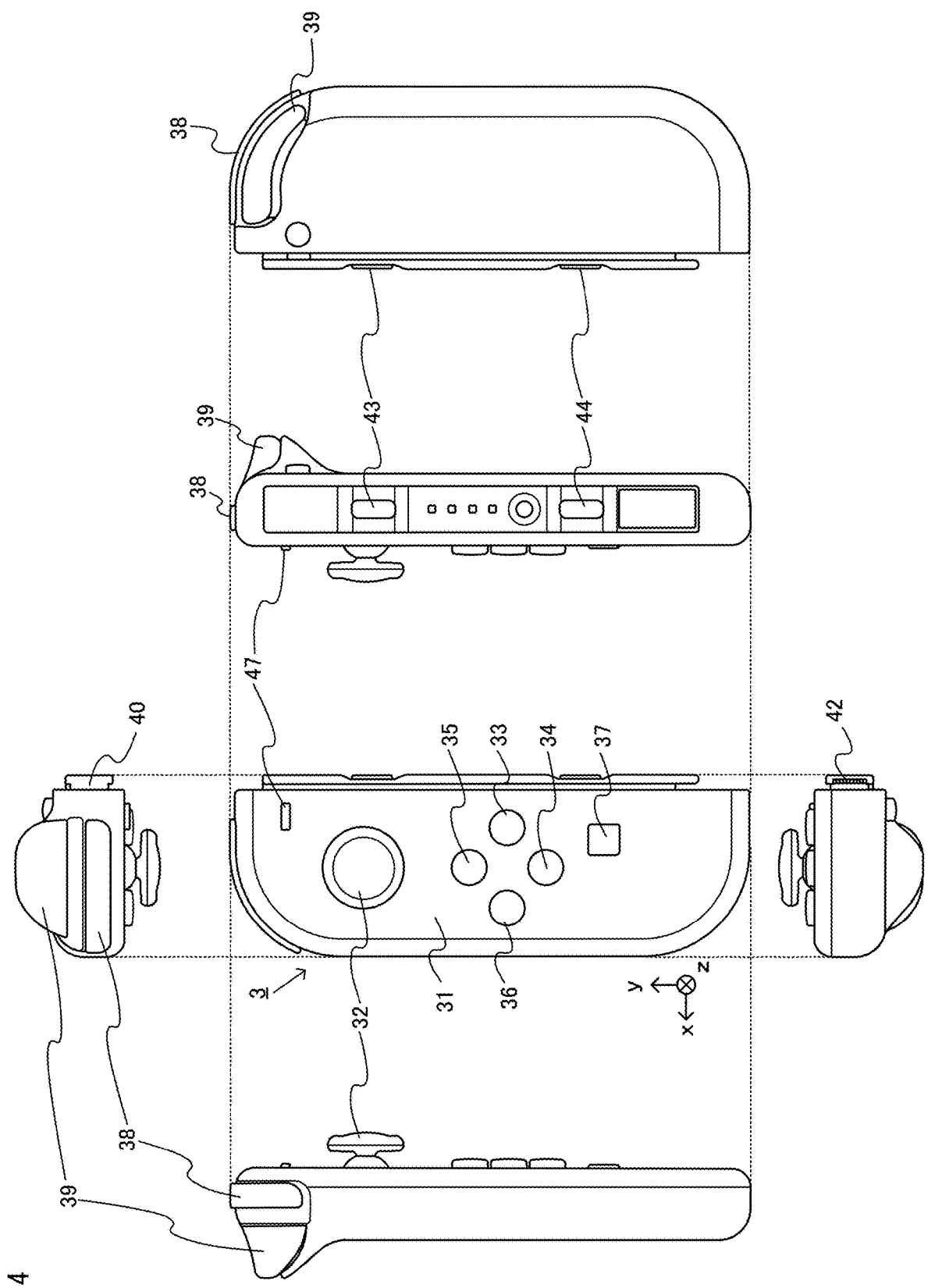
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly, the left hand. Further, the left controller 3 can also be held in the orientation in which the left controller 3 is horizontally long. When held in the orientation in which the left controller 3 is horizontally long, the left controller 3 may be held with both hands.

The left controller 3 includes a left analog stick (hereinafter, referred to as a "left stick") 32. As shown in FIG. 4, the left stick 32 is provided on a main surface of the housing 31. The left stick 32 can be used as a direction input section with which a direction can be inputted. The user tilts the left stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the left stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
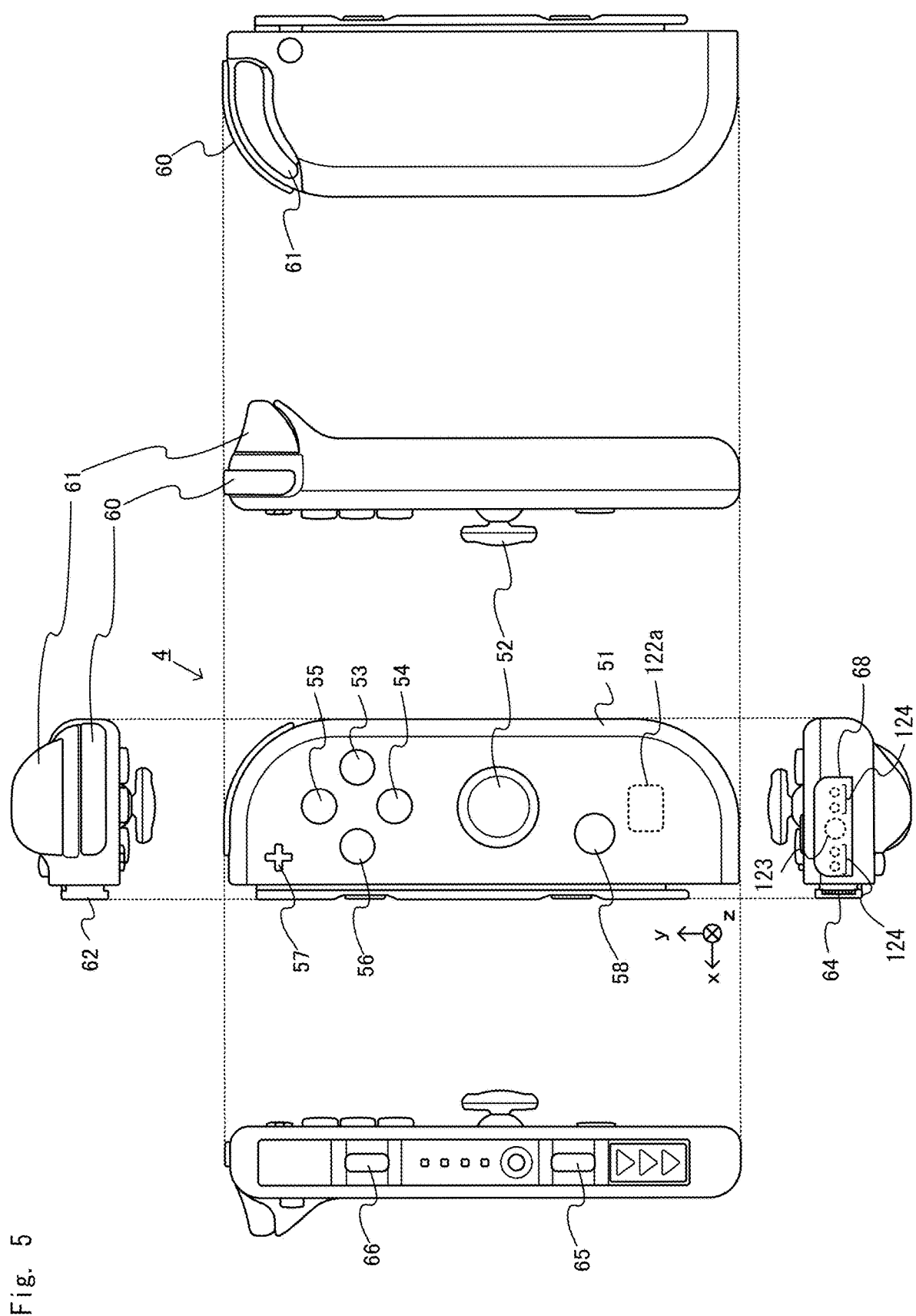
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes a right analog stick (hereinafter, referred to as a "right stick") 52 as a direction input section. In the exemplary embodiment, the right stick 52 has the same configuration as that of the left stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
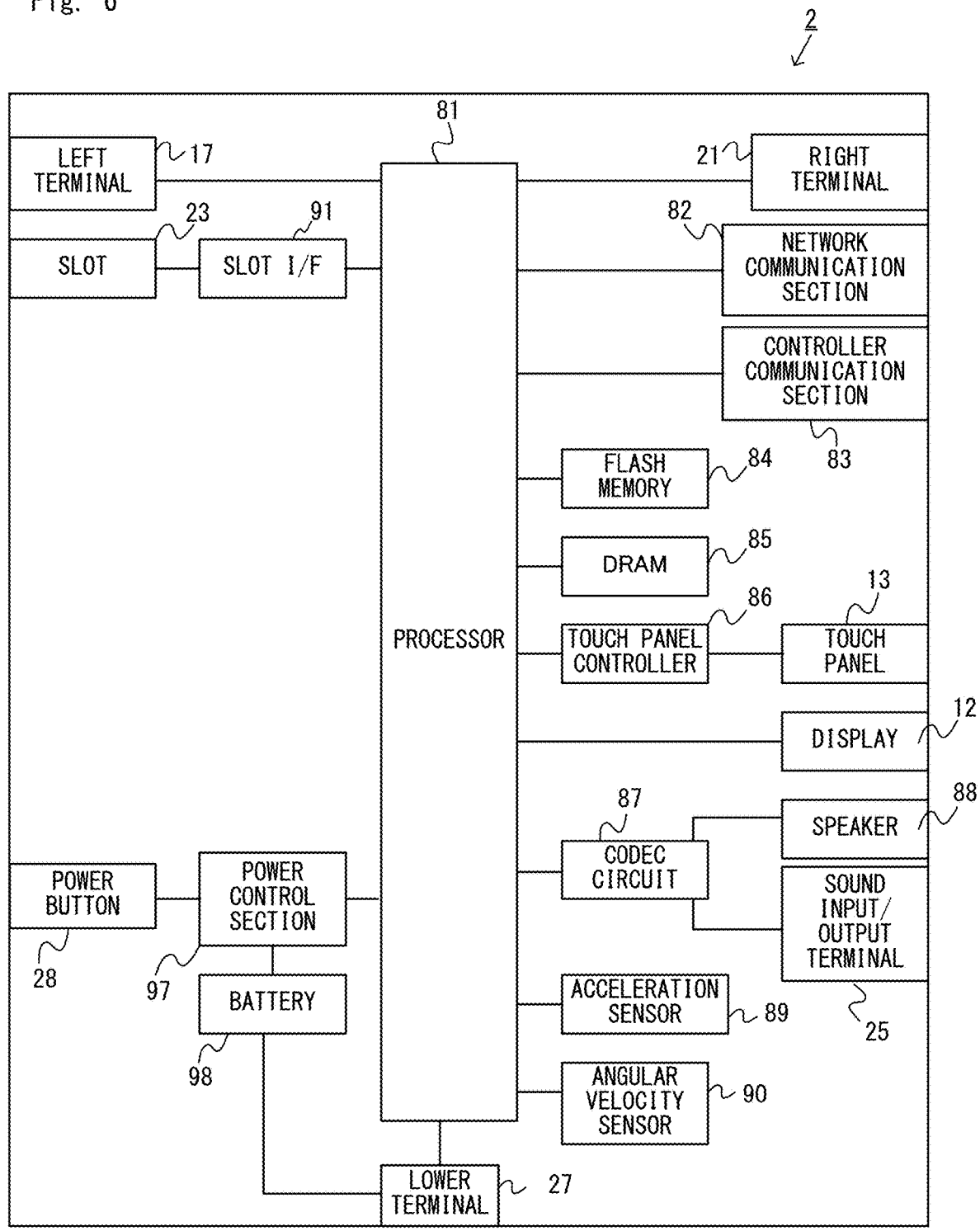
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes the flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter, abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined method for communication (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is discretionary. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. On the basis of a signal from the touch panel 13, the touch panel controller 86 generates data indicating the position at which a touch input has been performed, for example, and outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
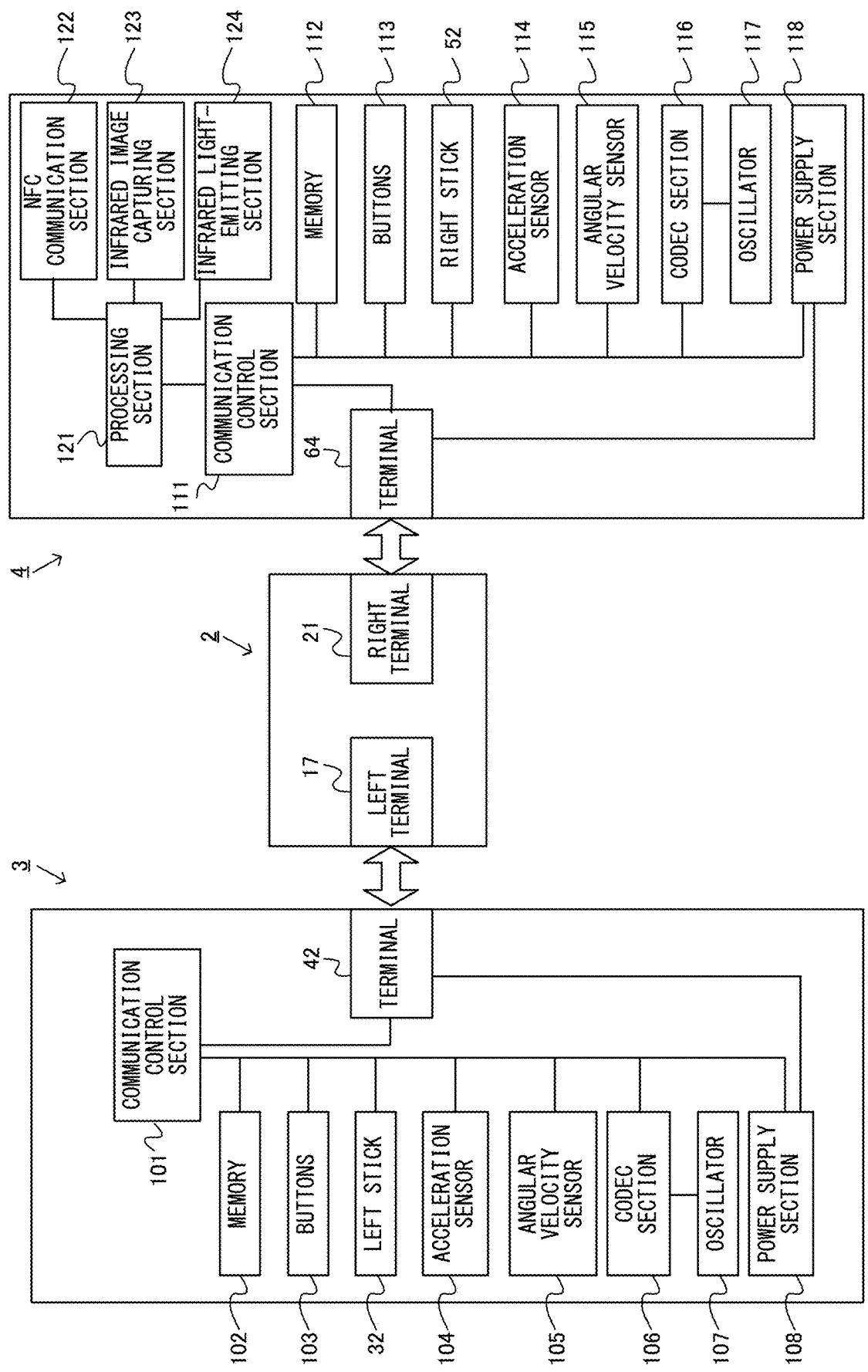
FIG. 7 is a block diagram showing non-limiting examples of the internal configurations of the main body apparatus 2, the left controller 3, and the right controller 4.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the left stick 32. Each of the buttons 103 and the left stick 32 outputs information regarding an operation performed on itself to the communication control section 101 repeatedly at appropriate timings.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are outputted to the communication control section 101 repeatedly at appropriate timings.

The communication control section 101 acquires information regarding an input (specifically, information regarding an operation or the detection result of the sensor) from each of input sections (specifically, the buttons 103, the left stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the left stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the right stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

[Outline of Game Processing of Exemplary Embodiment]

Next, the outline of operation of game processing executed by the game system 1 according to the exemplary embodiment will be described. Here, in the above game system 1, the left controller 3 and the right controller 4 are attachable to and detachable from the main body apparatus 2. When a game is played in the state where the left controller 3 and the right controller 4 are attached to the main body apparatus 2, the game image is outputted to the display 12. When the main body apparatus 2 alone in the state where the left controller 3 and the right controller 4 are detached from the main body apparatus 2 is attached to the cradle, the main body apparatus 2 can also output the game image to a stationary monitor or the like via the cradle. In the exemplary embodiment, description is given of an example case where the game is played in the latter form, i.e., in the form in which the main body apparatus 2 alone in the state where the left controller 3 and the right controller 4 are detached from the main body apparatus 2 is attached to the cradle and the main body apparatus 2 outputs the game image and the like to the stationary monitor or the like via the cradle.

Figure 8:
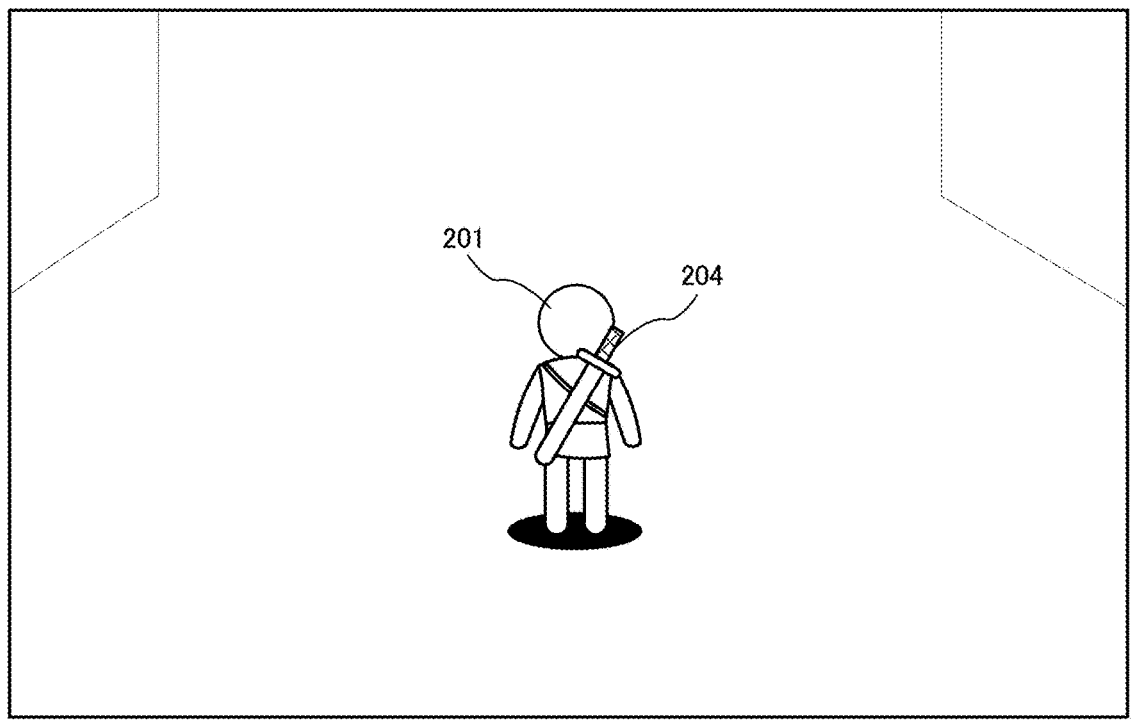
FIG. 8 shows a non-limiting example of a game screen according to an exemplary embodiment.
Figure 9:
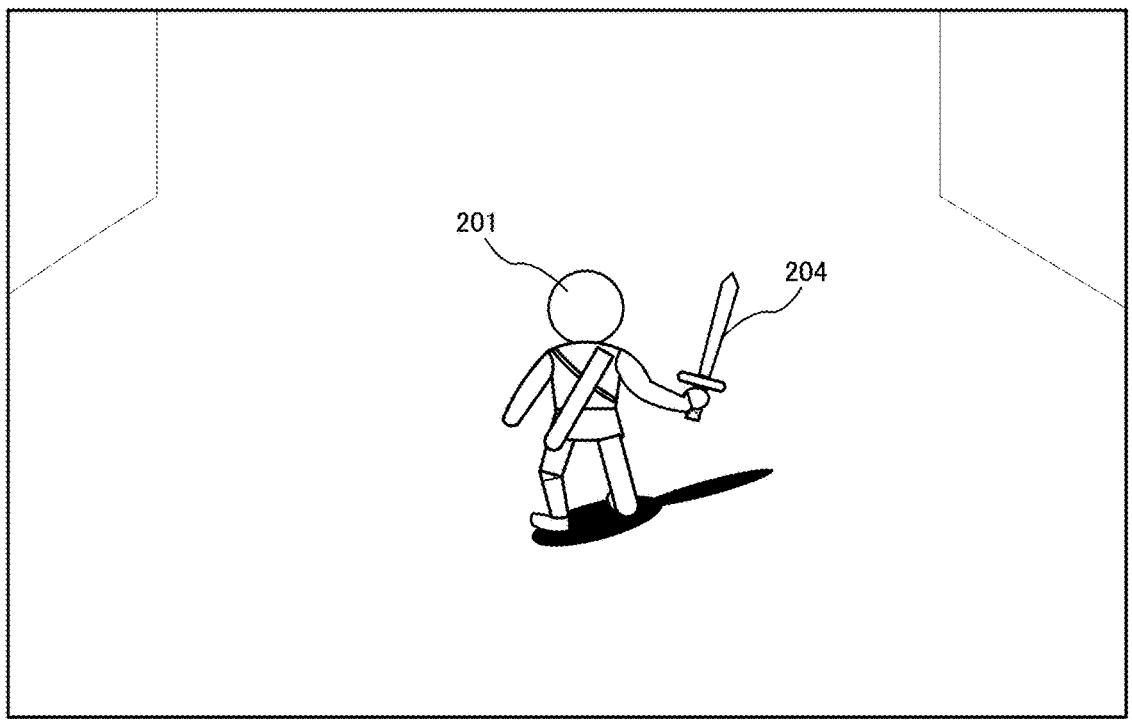
FIG. 9 shows a non-limiting example of the game screen according to the exemplary embodiment.

The game (hereinafter, referred to as "this game") assumed in the exemplary embodiment is an action adventure game in which a player object is operated in a virtual three-dimensional space. FIG. 8 is an example of a game screen assumed in the exemplary embodiment. In FIG. 8, how the three-dimensional virtual game space is seen is shown on the game screen. In the three-dimensional virtual game space, a player object 201 is present and an image seen from behind and captured by a virtual camera is displayed. The entire body of the player object 201 is displayed on the game screen. Further, the player object 201 carries a sword object 204 on its back. The sword object 204 is in a state of being in a sheath, and the sword object 204 can be drawn from the sheath through an operation described later. Hereinafter, drawing the sword object 204 from the sheath will be referred to as "sword drawing". FIG. 9 shows an example of the screen regarding the player object 201 after sword drawing has been performed. FIG. 9 shows a state where the sword object 204 is gripped with the right hand of the player object 201. In this state, the player can move the sword object 204 within a range based on the movable range of the right arm of the player object 201.

In this game, the player object 201 can be caused to perform a movement of "swinging" the sword object 204. Thus, the player object 201 can attack a predetermined enemy object (not shown) by swinging the sword object 204. Further, the player object 201 can also "slash" a predetermined object other than an enemy, such as a plant object. The processing according to the exemplary embodiment is processing regarding an operation for causing the player object 201 to perform a movement of "swinging" the sword object 204. In the exemplary embodiment, the movement of "swinging" the sword object 204 includes two actions, i.e., a "posturing action" and a "swinging action" described later.

Figure 10:
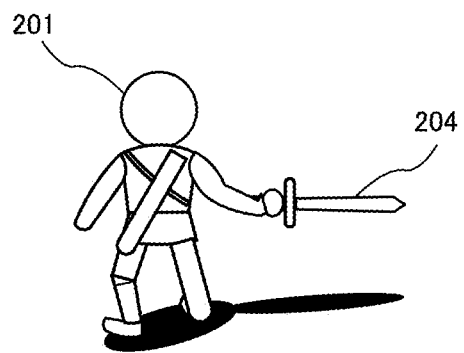
FIG. 10 shows a non-limiting example of a player object taking a posture of holding a sword.
Figure 11:
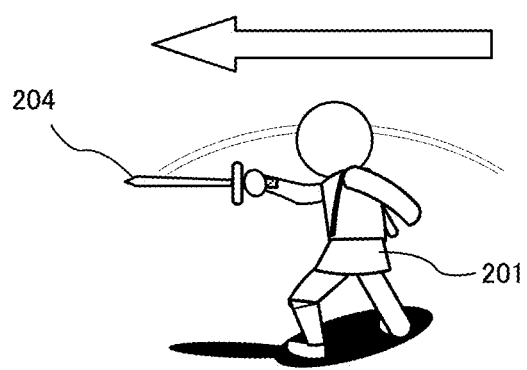
FIG. 11 shows a non-limiting example of a swinging action.

Next, before describing specific operation contents, the "state (in the game)" of the player object 201 related to the movement of "swinging" as described above, and the transition thereof will be described. Hereinafter, the state in the game of the player object 201 will be referred to as a "PO state". First, in this game, the PO state where the sword object 204 is in the sheath as shown in FIG. 8 is referred to as a "non-sword-drawn state". In this state, when a predetermined sword drawing operation is performed, a sword drawing motion is displayed, and then, as shown in FIG. 9, the player object 201 enters a state where the player object 201 has the sword object 204 with the right hand. In the exemplary embodiment, this PO state is referred to as a "posturing state". In the posturing state, the player can cause the player object 201 to perform a posturing action. The posturing action is an action of changing the position and orientation of the sword object 204 in the movable range of the right arm of the player object 201. That is, the posturing action is such an action in which the player object 201 takes a posture of holding the sword before swinging the sword. FIG. 10 shows an example in which the player object 201 takes a posture of holding the sword object 204 with the tip thereof directed toward the right direction. In the posturing state, the orientation of the sword object 204 can be changed by an operation described later. Then, in the posturing state, when a predetermined condition has been satisfied (i.e., when a predetermined operation has been performed), a motion of actually swinging the sword object 204 is displayed. Hereinafter, the PO state in the middle of swinging the sword object 204 will be referred to as a "swinging state". Further, the motion of swinging the sword will be referred to as a "swinging action". FIG. 11 shows an example of the player object 201 in the "swinging state". In the example in FIG. 11, a swinging action like a horizontal slashing from the right direction toward the left direction is shown.

Figure 12:
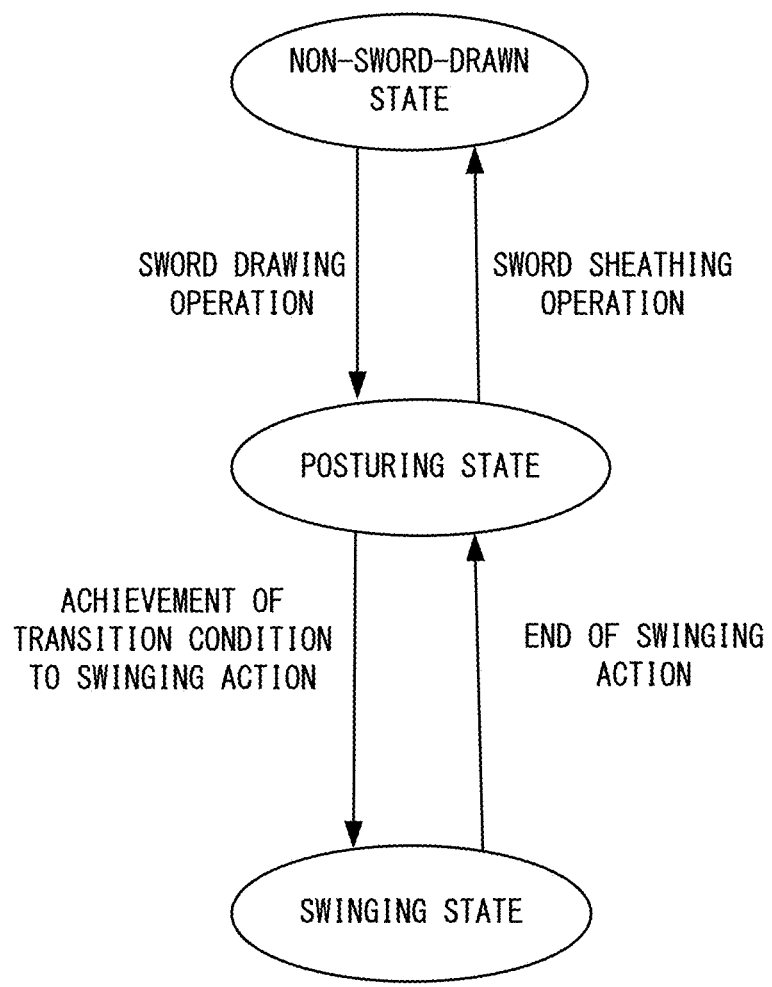
FIG. 12 illustrates a non-limiting example of transition of the state of the player object.

FIG. 12 shows a transition relationship between the PO states described above. In FIG. 12, first, when a "sword drawing operation" as described later is performed in the non-sword-drawn state, the PO state transitions to the posturing state described above. Next, in the posturing state, when a condition for transitioning to the swinging action described above has been satisfied, the PO state transitions to the swinging state. Details of this condition will be described later. Hereinafter, this condition will be referred to as a "sword-swinging execution condition". When the PO state has transitioned to the swinging state, a motion related to the swinging action as described above is displayed. Then, when the swinging action ends, the PO state returns (transitions) to the posturing state. Then, in the posturing state, when a "sword sheathing operation" for putting the sword object 204 into the sheath is performed, the PO state transitions to the above non-sword-drawn state. Therefore, for example, in the exemplary embodiment, when an enemy object is attacked by using the sword object 204, a series of actions comprising two actions, i.e., the above-described posturing action and swinging action, are performed. In other words, in the exemplary embodiment, the movement of swinging the sword object 204 is realized as a series of actions "from posturing to swinging".

[Operation Mode]

Next, specific operations for causing the movement as described above are described. In the exemplary embodiment, two operation modes are provided for causing the movements as described above to be performed. A first operation mode is an operation mode that mainly uses the right stick 52 provided to the right controller 4. A second operation mode is an operation mode that uses inertial sensors of the right controller 4. It should be noted that, in the exemplary embodiment, either one of these operation modes is set. For example, on a game setting screen, an item for setting an operation mode is provided, and either one of the operation modes is designated. Therefore, when the first operation mode is set, operation according to the second operation mode cannot be performed. The same applies vice versa.

[Second Operation Mode]

Next, each operation mode will be described. For convenience of description, the second operation mode is described first. A described above, the second operation mode uses inertial sensors of the right controller 4. Specifically, in the second operation mode, the player regards the right controller 4 as the sword object 204, and can change the orientation of or swing the sword object 204 by tilting or swinging the right controller 4.

In an example of the operation, first, in the non-sword-drawn state, when the player presses a predetermined button, the player object 201 performs sword drawing and the PO state transitions to the posturing state. At this time, on the basis of outputs from the inertial sensors, the orientation of the right controller 4 is calculated, and the orientation is reflected in the orientation of the sword object 204. For example, the inertial sensors include a gyro sensor, and the orientation of the right controller 4 is calculated on the basis of the angular velocity detected by the gyro sensor. Here, a case where the orientation as shown in FIG. 9 has been established as a result of a sword drawing operation is assumed. Next, it is assumed that, when the screen is in the state as shown in FIG. 9, the player has horizontally stretched the right arm and the right controller 4 has also taken a substantially horizontal orientation. In this case, the orientation of the right controller 4 is calculated on the basis of outputs from the inertial sensors, and this orientation is reflected in the position and orientation of the sword object 204. As a result, the position and orientation of the sword object 204 (and the player object 201) are changed to those as shown in FIG. 10.

Further, it is assumed that, when the game screen is in the state as shown in FIG. 10, the player swings the right controller 4 in the left direction at not less than a predetermined speed. In this case, a motion of swinging the controller is detected on the basis of outputs from the inertial sensor. For example, the inertial sensors include an acceleration sensor, and it is determined that the controller has been swung, on the basis of determination that an acceleration having not less than a predetermined value has been detected. As a result, the PO state transitions to the swinging state, and change in the orientation of the right controller 4 in this swinging motion is reflected in change in the position and orientation of the sword object 204. As a result, the player object 201 performs the swinging action as shown in FIG. 11.

As described above, in the second operation mode, on the basis of outputs of the inertial sensors, the orientation of the right controller 4 is calculated, and swinging is determined. Then, the calculated orientation of the right controller 4 is reflected in the sword object 204, whereby a series of actions comprising the above-described posturing action and swinging action are realized. Accordingly, the sword object 204 can be swung by moving the right controller 4 itself, and thus, an intuitive operation can be performed. In addition, a user experience as if the user was actually swinging the sword can be provided.

[First Operation Mode]

As described above, in the second operation mode, the inertial sensors are used, whereby an operation method of moving the right controller 4 itself is provided. Here, in the game system 1 according to the exemplary embodiment, as described above, the left controller 3 and the right controller 4 are attachable to and detachable from the main body apparatus 2. Therefore, there are also cases where the game screen is displayed on the display 12 when the game is played in the state where the left controller 3 and the right controller 4 are attached to the main body apparatus 2 as shown in FIG. 1. In such a case, it is considered that the operations as described above using the inertial sensors of the right controller 4 are difficult to be performed. In addition, there may be a case where the player does not like in the first place the operation method such as the second operation mode. Therefore, the first operation mode is provided in the exemplary embodiment. In this operation mode, it is possible to perform a series of actions comprising the posturing action and the swinging action, as in the case of the second operation mode, through a simple direction input operation using the right stick 52. Therefore, even in the state where the left controller 3 and the right controller 4 are attached to the main body apparatus 2, it is possible to cause the player object 201 to perform movement of swinging the sword object 204, as in the case of the second operation mode.

Next, the outline of operations and processing in the first operation mode is described. First, handling of operation input data of the right stick 52 is described. In the first operation mode, operation input data from the right stick 52 is obtained as a two-dimensional value. That is, it is assumed that operation input data from the right stick 52 is obtained as a two-dimensional value of (x, y). Then, in the exemplary embodiment, a two-dimensional plane (hereinafter, stick plane) of a coordinate system in which, with the right stick 52 viewed from immediately above, the right direction is the x-axis positive direction and the up direction is the y-axis positive direction, is assumed. In this stick plane, the position of the right stick 52 being in a neutral state (the state where the right stick 52 is not tilted in any direction) is defined as the origin. In this case, the vector (hereinafter, referred to as an input vector) connecting this origin and the coordinate represented by the above-described two-dimensional value indicates the input strength and the input direction. That is, the length of the input vector indicates the degree of tilt of the right stick 52, and the orientation of the input vector indicates the input direction.

Figure 13:
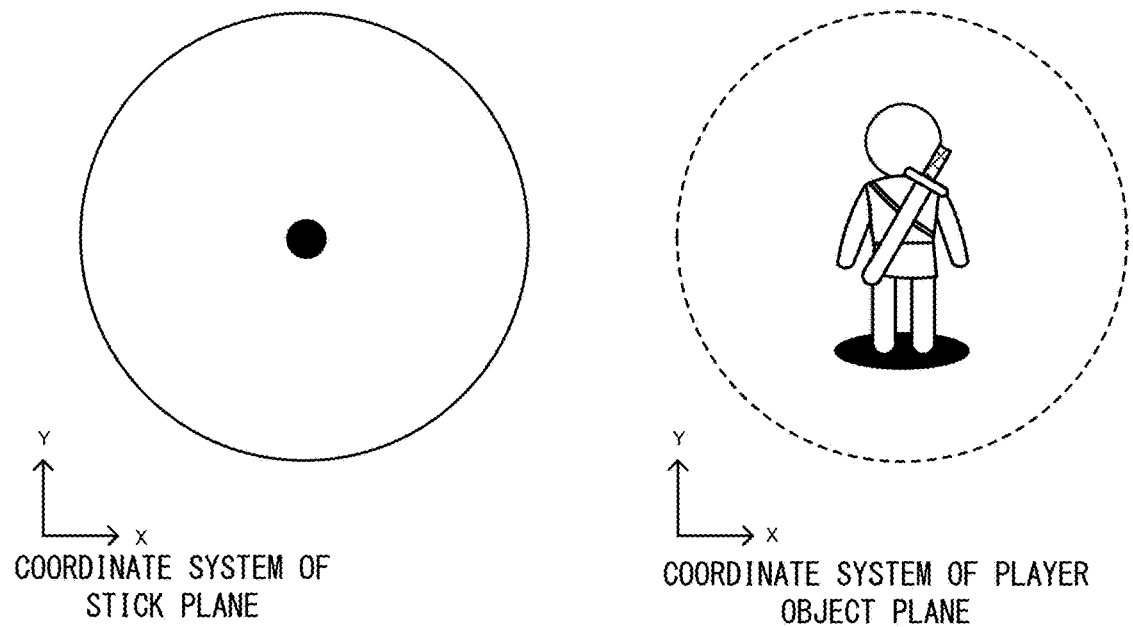
FIG. 13 shows a non-limiting example of a posturing action.

Next, the relationship between the input content of the right stick 52 and the posturing action and swinging action is described. In the exemplary embodiment, the stick plane is associated with an x-y plane that is defined with the player object 201 seen from behind. FIG. 13 shows the correspondence between the stick plane and the x-y plane (hereinafter, referred to as a player object plane). In FIG. 13, a circular stick plane is shown on the left side. Further, in FIG. 13, the player object 201 is shown on the right, and the player object plane is indicated by a dotted line surrounding the player object 201. It should be noted that the outer circumference of the circle of the stick plane indicates the input limit (where the right stick 52 is tilted to the maximum) of the right stick 52. In FIG. 13, a plane in which the player object 201 is seen from behind is assumed, and correspondence in which a substantial center portion of the player object 201 matches the origin of the stick plane is assumed. It should be noted that, in another example, a root portion of the right arm and the origin of the stick plane may be associated with each other.

On the assumption of the above correspondence relationship, the following operation can be performed in the first operation mode. First, it is assumed that the operation of the sword drawing is the same as that in the second operation mode described above. When sword drawing has been performed, a predetermined sword drawing motion is displayed, and then, the PO state transitions to the posturing state. In this posturing state, the orientation of the sword object 204 can be changed in accordance with an input of the right stick 52. In the case where the input of the right stick 52 is neutral, a predetermined orientation corresponding thereto is taken.

Figure 14:
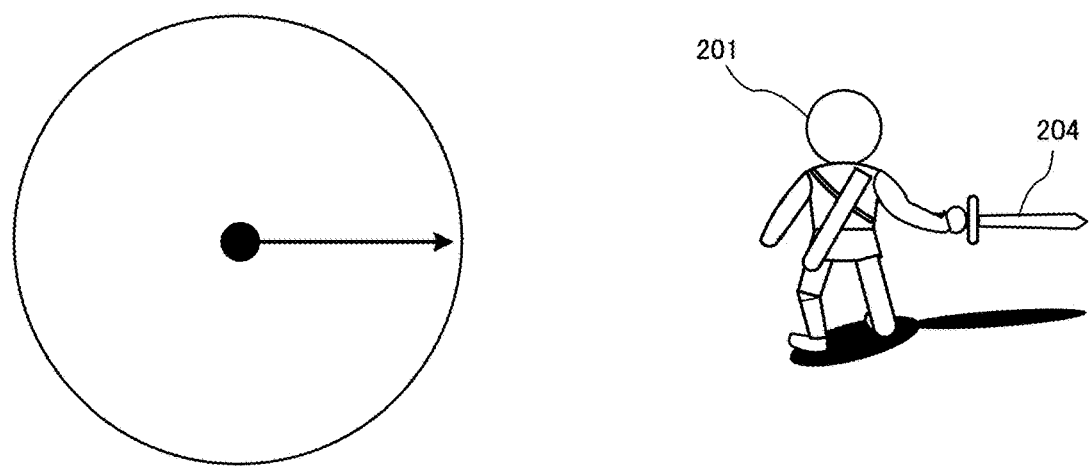
FIG. 14 shows a non-limiting example of the posturing action.

FIG. 14 shows an example of a case where the right stick 52 has been tilted to the maximum in the right direction. In FIG. 14, the stick plane and the input vector thereof (arrow) are shown on the left side, and the orientation of the sword object 204 (and the player object 201) corresponding to this input is shown on the right side. As shown in FIG. 14, when the right stick 52 has been tilted to the maximum in the right direction, the orientation of the sword object 204 is also changed, in accordance with this, to an orientation in which the tip of the sword object 204 is directed to the right. It should be noted that the position in the depth direction (on the z axis) may be any position corresponding to the game content, but basically, is a position that is influenced by the movable range of the right arm of the player object 201 having the sword object 204.

Figure 17:
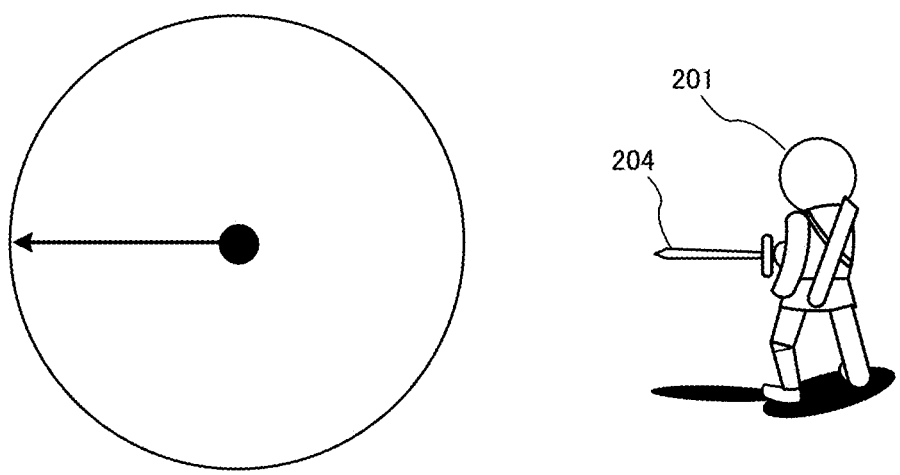
FIG. 17 shows a non-limiting example of the posturing action.
Figure 18:
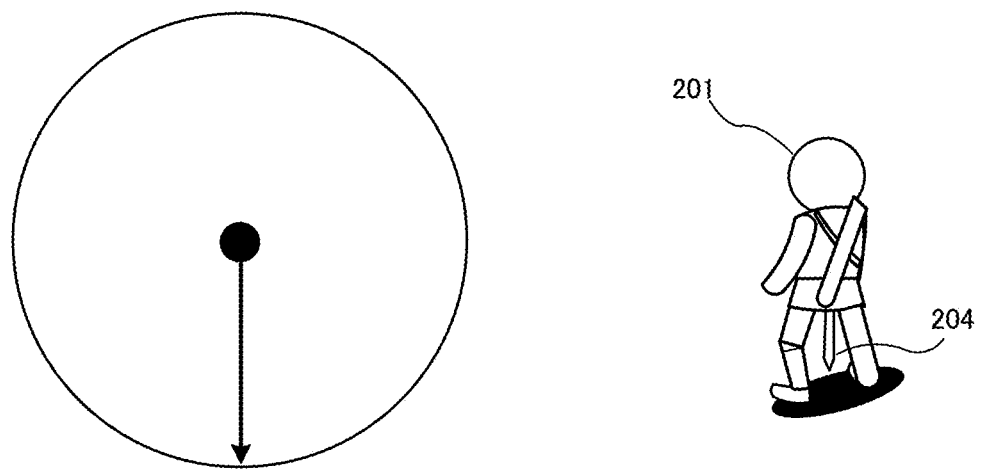
FIG. 18 shows a non-limiting example of the posturing action.

A case in which, from the orientation shown in FIG. 14, only the input direction of the right stick 52 is further rotated counter-clockwise while the right stick 52 is tilted to the maximum, is assumed. FIGS. 15 to 18 show examples of changes in the orientation in this case. FIG. 15 shows a case where the input direction of the right stick 52 is an upper right direction. In this case, the tip of the sword object 204 is also in an orientation directed to the upper right direction on the player object plane. Further, when the input direction of the right stick 52 is changed to the straight up direction, the orientation of the tip of the sword object 204 is changed to an orientation directed to the straight up direction in the player object plane, as shown in FIG. 16. Further, when the input direction of the right stick 52 is changed to the left direction, the tip of the sword object 204 is changed to an orientation directed to the left direction in the player object plane, as shown in FIG. 17. Further, when the input direction of the right stick 52 is changed to the straight down direction, the orientation of the tip of the sword object 204 is changed to an orientation directed to the straight down direction in the player object plane, as shown in FIG. 18.

In this manner, in the first operation mode, in the posturing state, the posturing action can be performed by an input operation of the right stick 52. That is, the orientation of the sword object 204 can be changed such that (the tip of) the sword object 204 is directed to a direction corresponding to the direction input of the right stick 52.

Next, the swinging action in the first operation mode is described. In the exemplary embodiment, in the posturing state, when the player releases the finger from the right stick 52 in a state where the right stick 52 is tilted to the maximum, the posturing state can be caused to transition to the swinging state. The right stick 52 is a stick that (naturally) returns to the neutral position when the finger is released in a state where the right stick 52 is tilted in a certain direction. Accordingly, it is possible to almost instantaneously return the right stick 52 to the neutral state by releasing the finger from the right stick 52 in a state where the right stick 52 is tilted. In the first operation mode, using the release (cancelation of the direction input of the right stick) of the finger in a state where the right stick 52 is tilted to the maximum, as a trigger, the PO state of the player object 201 is transitioned from the posturing state to the swinging state, whereby the swinging action as described above is performed. Hereinafter, the operation of canceling the direction input serving as a trigger for the swinging action will be referred to as a "release operation".

Figure 19:
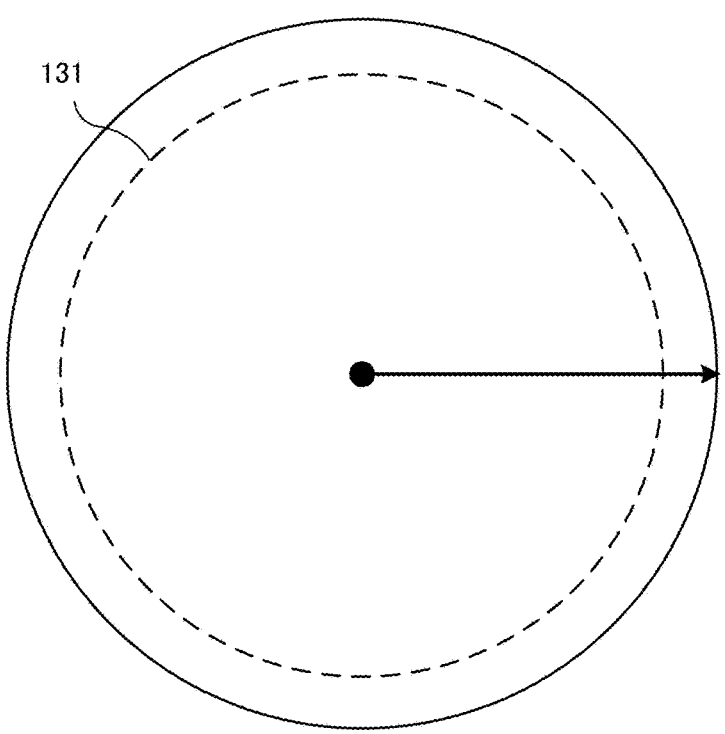
FIG. 19 illustrates a non-limiting example of a swing occurrence threshold.
Figure 20:
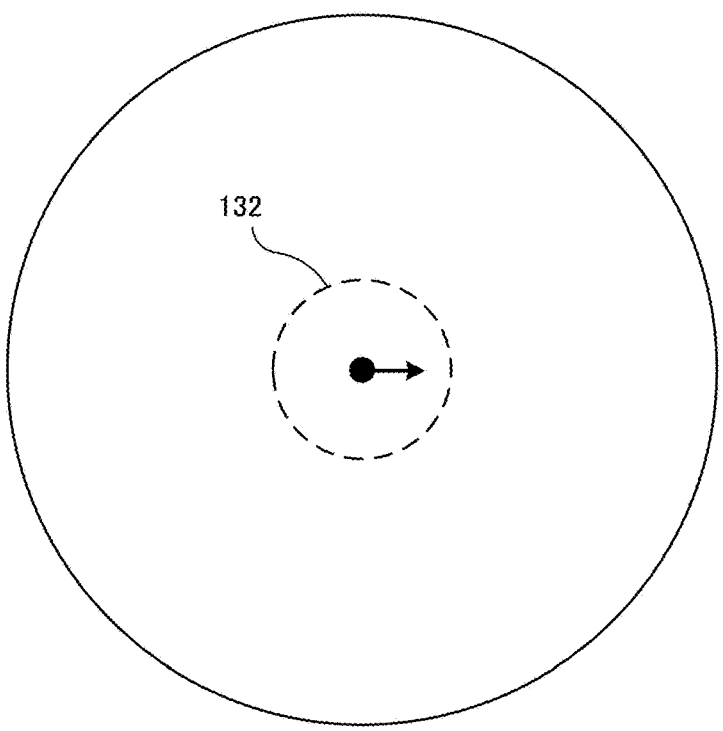
FIG. 20 illustrates a non-limiting example of a release determination threshold.

Here, supplementary description of a determination method of the release operation is given. Each of FIGS. 19 and 20 illustrates a determination method of the release operation. Each of FIGS. 19 and 20 shows the stick plane. First, in FIG. 19, a first threshold 131 is shown at a position that is on a slightly inner side of the outer circumference of the stick plane. In the exemplary embodiment, in the posturing state, when the release operation is performed while the length of the input vector from the origin exceeds the first threshold 131, the swinging action can be performed. Conversely, when the finger is released from the right stick 52 in a state where the length of the input vector does not exceed the first threshold, the release operation cannot be performed. That is, the player object 201 does not enter the swinging state and maintains the posturing state, and the orientation of the sword object 204 is merely changed (i.e., the sword object 204 takes the orientation at the time of the neutral state). That is, in order to perform the swinging action, the right stick 52 is required to have a tilt that is large to some extent. In the description below, the first threshold 131 will be referred to as a "swing occurrence threshold".

Next, in FIG. 20, a second threshold 132 is shown on a slightly outer side of the origin of the stick plane. In the exemplary embodiment, when the length of the input vector has been changed, within a predetermined time, e.g., within three frames, from an input state where the length of the input vector exceeds a swing occurrence threshold 131 as in FIG. 19, to a state where the length of the input vector does not exceed the second threshold 132, it is determined that the above-described release operation has occurred. That is, in a case where the finger has been released from the stick, when the time until the stick returns to the vicinity of the neutral position is short to some extent, it is determined that the above-described operation of releasing the finger from the stick has been performed. In the description below, the second threshold 132 will be referred to as a "release determination threshold". It should be noted that the aforementioned "within three frames" is merely an example, and it is understood that an appropriate number of frames may be used in accordance with the game content.

As described above, the player performs the release operation as described above while the player object 201 is in the posturing state, thereby being able to cause the player object 201 to perform the swinging action. The direction in which the sword object 204 is swung is assumed to be a direction opposite to the direction in which the right stick 52 has been tilted. For example, as shown in FIG. 14, when the finger is released in a state where the stick is tilted to the maximum in the right direction, a swinging action of completely swinging the sword toward the left direction, as shown in FIG. 11, is performed. According to this operation method, by tilting the right stick 52 to the maximum in a direction opposite to the direction in which the player wants to swing the sword, and then releasing the finger, the player can cause the sword object 204 to be swung in the desired direction. In addition, although it is necessary to tilt the right stick 52 to a substantially maximum extent in order to perform the swinging action, the tilting direction of the right stick 52 can be changed along the outer circumference portion surrounding the shaft of the right stick 52. That is, the outer circumference portion of the shaft of the right stick 52 plays a kind of guide role, whereby aiming in the direction of swinging the sword is facilitated. Therefore, accurate direction input is facilitated with respect to the direction of swinging the sword object 204. The flow of a series of actions from the posturing action to the swinging action as described above facilitates accurate direction input.

The ease of accurate direction input due to the flow of a series of actions from the posturing action to the swinging action as described above is particularly useful when there is a gimmick that requires swinging the sword object 204 in a predetermined direction in the progress of the game, for example. Examples of the gimmick include an enemy object that is defeated only when the sword is swung in a predetermined direction, a trap object that is released only by being hit by the sword object 204 from a predetermined direction, and the like. In such a case, the following game processing is performed: the swing direction in the swinging action is determined; and then whether the attack on the enemy has been successful or not, whether release of the trap has been successful or not, or the like is determined.

In the first operation mode, since the processing as described above is performed, it is also possible to perform the posturing action and the swinging action consecutively and instantaneously through an operation of flicking the right stick 52 (hereinafter, a flicking operation). As the flicking operation, for example, a case where the right stick 52 is operated so as to be flicked in the right direction in a state where the sword is drawn and the right stick 52 is in the neutral state, is assumed. In this case, an input of the right stick 52 is provided as follows: an input vector exceeding the swing occurrence threshold 131 occurs from the neutral state, and then, the input vector is changed to be smaller than a release determination threshold 132. As a result, the occurrence of the input vector exceeding the swing occurrence threshold 131 in the right direction, and the change into an input vector smaller than the release determination threshold 132 (and determination that a release operation has occurred) occur in a very short time of about several frames. Therefore, by simply performing such a flicking operation, the player can cause the player object 201 to perform a swinging action in a direction opposite to the direction of the flicking, within a time that can be regarded as substantially "instant". Accordingly, it is possible to provide the player with an operation of instantaneously executing a swinging action through the flicking operation, in addition to an operation of executing a swinging action after the direction of swinging is carefully aimed through the posturing action.

In the exemplary embodiment, an example in which the player presses a predetermined button in the non-sword-drawn state, thereby transitioning the PO state to the posturing state, has been described. However, in another exemplary embodiment, in the first operation mode, sword drawing may be performed when an input of the right stick 52 has been provided in the non-sword-drawn state. In this case, if the flicking operation is performed, it is also possible to cause the player object 201 to perform a motion of suddenly executing the swinging action from the non-sword-drawn state.

With respect to the release operation, an example in which the finger is released from the right stick 52 has been described. In this regard, as the determination processing, if it can be determined that the input state as shown in FIG. 19 has changed to the input state as shown in FIG. 20 within a predetermined time, the operation is determined as the release operation. Therefore, in a case where the finger is not released from the right stick 52 and a direction input is quickly performed from a state where the right stick 52 is tilted to the maximum to the right to a state where the right stick 52 is tilted to the maximum to the left, for example, if the condition that "the input vector becomes smaller than the release determination threshold within three frames" is satisfied, it is determined that the release operation has been performed, and the swinging action can also be performed. Therefore, for example, if operations of alternately tilting the right stick 52 to the left and right are quickly repeated, swinging actions of right swinging and left swinging are alternately repeated. Accordingly, it is also possible to cause the player object 201 to perform an action as if the player object 201 was consecutively performing cutting. That is, when such consecutive operations are performed, a set of the posturing action and the swinging action is consecutively executed.

As described above, in the exemplary embodiment, with respect to the posturing action and the swinging action, an operation method using the inertial sensors is provided to the player as the second operation mode. Further, also in the first operation mode, a posturing action and a swinging action similar to those in the second operation mode can be performed simply through an operation of the right stick 52. Accordingly, an appropriate operation method suitable for the player can be provided.

Further, in this game, in addition to the operations regarding the sword object 204 as described above, the following operations are also possible.

[Moving Operation]

In this game, the player object 201 can be moved by using the left stick 32. Therefore, while the player object 201 is moved by the left stick 32, an operation of the sword object 204 using the right controller 4 can also be performed. Accordingly, for example, attacking an enemy object while moving can also be performed.

[Virtual Camera Operation]

In this game, the imaging direction of the virtual camera can also be changed by operating the right stick 52 in a state where a predetermined button is pressed. For example, when the right stick 52 is operated while the first R-button 60 is pressed, the orientation of the virtual camera can be changed on the basis of the direction input therefrom. During the operation of the virtual camera, control (in each of the first and second operation modes) of the sword object 204 by the right stick 52 is not performed. That is, while the first R-button 60 is pressed, the right stick 52 is used for the virtual camera operation, and while the first R-button 60 is not pressed, the right stick 52 is used for controlling the sword object 204.

Other than these, various operations related to the progress of the game, such as operations of using various items, can be performed.

[Details of Game Processing of Exemplary Embodiment]

Next, with reference to FIGS. 21 to 27, the game processing according to the exemplary embodiment will be described in more detail.

[Data to be Used]

Figure 21:
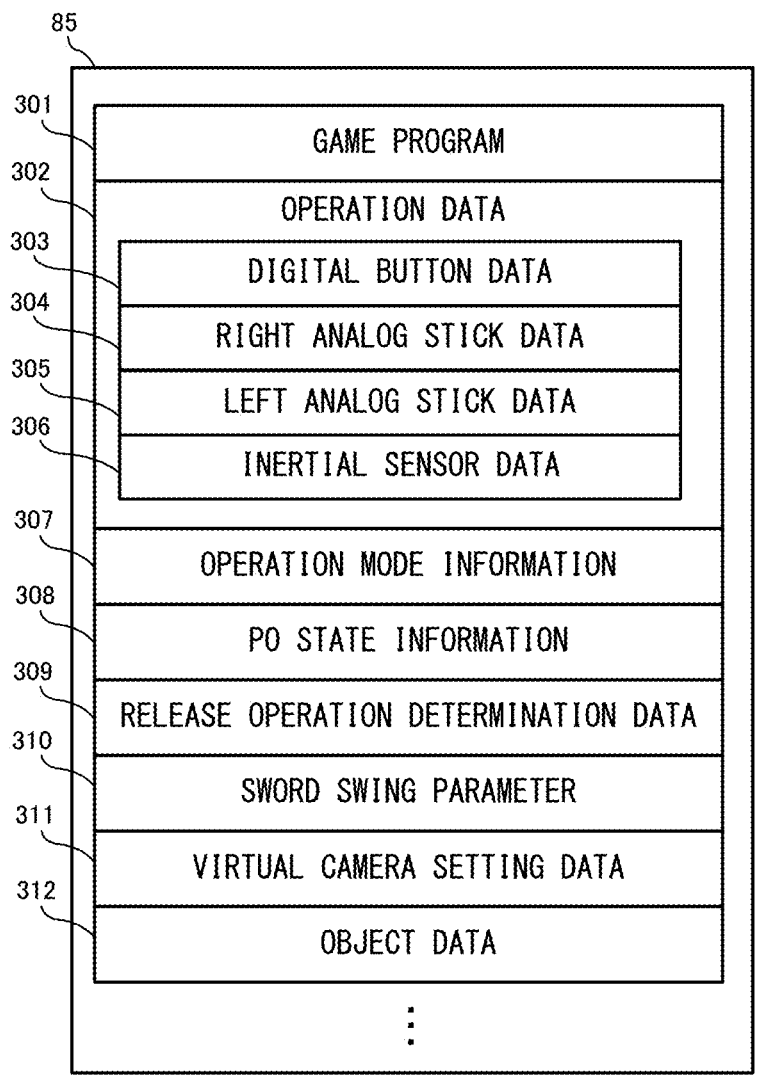
FIG. 21 shows a memory map showing a non-limiting example of various types of data stored in a DRAM 85.

First, various data to be used in this game processing will be described. FIG. 21 is a memory map showing an example of various data stored in the DRAM 85 of the main body apparatus 2. The DRAM 85 of the main body apparatus 2 has stored therein a game program 301, operation data 302, operation mode information 307, PO state information 308, release operation determination data 309, sword swing parameters 310, virtual camera setting data 311, object data 312, and the like.

The game program 301 is a program for executing the game processing according to the exemplary embodiment.

The operation data 302 is data obtained from the left controller 3 and the right controller 4, and is data indicating the content of an operation performed by the player. The operation data 302 includes, at least, digital button data 303, right analog stick data 304, left analog stick data 305, and inertial sensor data 306. The digital button data 303 is data indicating the pressed states of various buttons of the controller. The right analog stick data 304 is data for indicating the content of an operation performed on the right stick 52. Specifically, two-dimensional data of x, y is included. The left analog stick data 305 is data for indicating the content of an operation performed on the left stick 32. The inertial sensor data 306 is data indicating detection results of the inertial sensors such as the above-described acceleration sensor and angular velocity sensor. Specifically, acceleration data and angular velocity data are included.

The operation mode information 307 is information for indicating whether the current operation mode is the first operation mode or the second operation mode.

The PO state information 308 is information for indicating which of the above-described "non-sword-drawn state", "posturing state", and "swinging state" the state of the player object 201 is. The initial value is assumed to be the "non-sword-drawn state".

The release operation determination data 309 is data for determining whether or not the above-described release operation has been performed. Specifically, the right analog stick data 304 corresponding to the last several frames is stored (in another example, data indicating the above-described input vector may be stored). The data is sequentially replaced from the oldest data.

The sword swing parameters 310 are various parameters for moving the sword object 204 in the swinging action. For example, the sword swing parameters 310 are parameters indicating the moving direction, the moving speed, and the like of the sword object 204.

The virtual camera setting data 311 is data for designating the imaging direction and the like of the virtual camera. In accordance with an operation of the right stick 52 with the first R-button 60 being pressed as described above, the imaging direction is changed.

The object data 312 is data indicating the appearances of various objects that appear in this game, including the player object 201. Model data, texture data, and the like are included in the object data 312.

Other than these, various data that are necessary for the game processing are also generated as appropriate, and are stored in the DRAM 85.

[Details of Processing Executed by the Processor 81]

Next, with reference to the flowchart in FIG. 22, details of the game processing according to the exemplary embodiment will be described. It should be noted that, in the following, processing regarding the operation of the sword object 204 as described above is mainly described, and detailed description of the other game processing is omitted.

Figure 22:
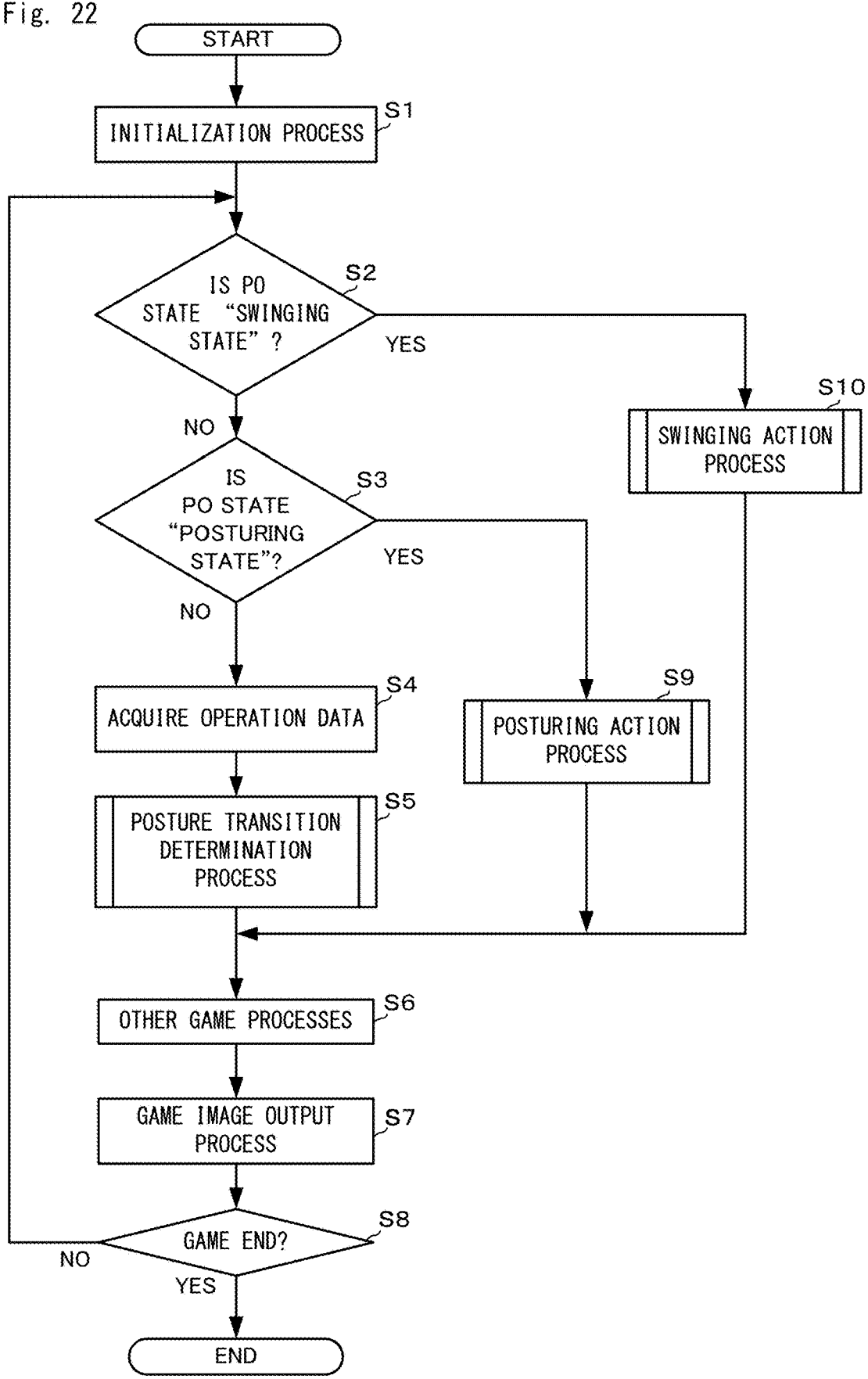
FIG. 22 is a non-limiting example of a flowchart showing details of game processing according to the exemplary embodiment.

FIG. 22 is a flowchart showing details of this game processing. In FIG. 22, first, in step S1, the processor 81 executes an initialization process for initializing data to be used in the processing thereafter. Specifically, data indicating the "non-sword-drawn state" is stored as the PO state information 308 in the DRAM 85. Further, the processor 81 sets, in the virtual camera setting data 311, various parameters (position, angle of view, gaze point) that enable display of a game image seen from behind the player object 201, as shown in FIG. 8. Further, the processor 81 constructs a three-dimensional virtual game space and places the player object 201 and the like as appropriate. A game image obtained by the virtual camera capturing the thus constructed game space is generated, and the generated game image is outputted to the stationary monitor or the like.

Next, in step S2, the processor 81 refers to the PO state information 308 and determines whether or not the PO state is the swinging state. As a result of this determination, when the PO state is the swinging state (YES in step S2), the processor 81 executes the process of step S10 described later. Meanwhile, when the PO state is not the swinging state (NO in step S2), the processor 81 determines, in step S3, whether or not the PO state is the posturing state. As a result, when the PO state is the posturing state (YES in step S3), the processor 81 advances to the process of step S9 described later.

Meanwhile, when the PO state is not the posturing state (NO in step S3), the PO state is the non-sword-drawn state, and thus, the processor 81 acquires the operation data 302 from the DRAM 85 in step S4.

Figure 23:
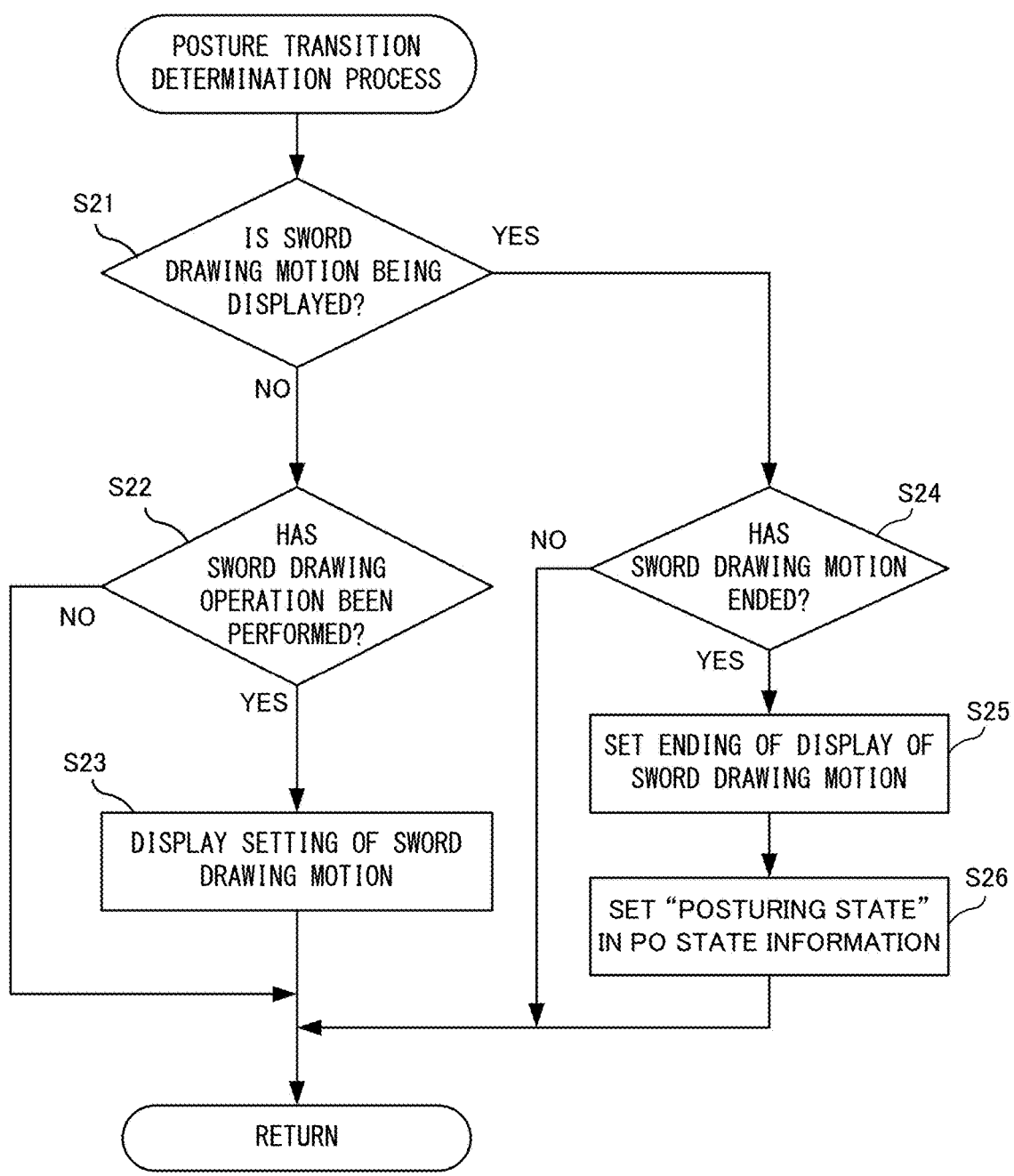
FIG. 23 is a non-limiting example of a flowchart showing details of a posture transition determination process.

Next, in step S5, the processor 81 executes a posture transition determination process. In this process, determination and the like as to whether or not to transition the PO state from the non-sword-drawn state to the posturing state are performed. FIG. 23 is a flowchart showing details of the posture transition determination process. In FIG. 23, first, in step S21, in the process regarding the current frame, whether or not a sword drawing motion is being displayed is determined. In the exemplary embodiment, when an operation of instructing sword drawing has been performed, a motion of the player object 201 drawing the sword object 204 is displayed over several frames. This determination is for determining whether or not this motion is being displayed. As a result of this determination, when the sword drawing motion is not being displayed (NO in step S21), the processor 81 determines, in step S22, whether or not a sword drawing operation has been performed, on the basis of the operation content indicated by the operation data 302. In the exemplary embodiment, whether or not a predetermined button assigned for the sword drawing operation has been pressed is determined. In addition to this, in another exemplary embodiment, for example, it may be determined that the sword drawing operation has been performed, also when the right controller 4 has been swung at not less than a predetermined acceleration, or when a direction input to the right stick 52 has occurred.

As a result of the determination above, when the sword drawing operation has been performed (YES in step S22), the processor 81 performs, in step S23, display setting for displaying the sword drawing motion. On the basis of this setting, the sword drawing motion is displayed in a game image output process of step S7 described later. In addition, due to this setting, in the determination in step S21, it is determined that the sword drawing motion is being displayed. This setting can be set by, for example, turning on a flag (not shown) indicating that the sword drawing motion is being displayed.

Meanwhile, when the sword drawing operation has not been performed (NO in step S22), the process of step S23 is skipped, and the posture transition determination process ends.

Next, a case where, as a result of the determination in step S21, it has been determined that the sword drawing motion is being displayed (YES in step S21), is described. In this case, in step S24, the processor 81 determines whether or not the sword drawing motion has ended. When the sword drawing motion has not ended (NO in step S24), the posture transition determination process ends. As a result, the sword drawing motion is continued to be displayed. Meanwhile, when the sword drawing motion has ended (YES in step S24), the processor 81 sets, in step S25, ending of the display of the sword drawing motion. For example, the processor 81 turns off the above-described flag indicating that the sword drawing motion is being displayed. Next, in step S26, the processor 81 sets data indicating a posturing state, in the PO state information 308. That is, in the exemplary embodiment, until the sword drawing motion ends, the PO state does not transition to the posturing state. It should be noted that, in another exemplary embodiment, the PO state may be caused to transition to the posturing state at the time point when the sword drawing operation has been performed. Then, the posture transition determination process ends.

With reference back to FIG. 22, next, in step S6, the processor 81 executes various game processes other than a posturing action process and a swinging action process which are described later. Specifically, a process of moving the player object 201 on the basis of the operation content (the left analog stick data 305) of the left stick 32 is performed. In addition, on the basis of the operation content of the right stick 52 with the first R-button 60 pressed, a process of changing parameters of the virtual camera is also performed. Further, a process of storing, in the release operation determination data 309, the right analog stick data 304 in the operation data 302 acquired for the frames of this time, is also executed. Further, in the case where the sword drawing motion is being displayed, a process of causing the player object 201 to perform a predetermined sword drawing motion is also executed. Other than these, also while the player object 201 is not performing the posturing action or the swinging action, various game processes related to the progress of the game are executed as appropriate.

Next, in step S7, the processor 81 executes the game image output process. Specifically, the processor 81 generates a game image by causing the virtual camera to capture the virtual game space reflecting the results of the above processes and of the posturing action process and the swinging action process which are described later. Then, the processor 81 outputs the game image to the stationary monitor.

Next, in step S8, the processor 81 determines whether or not an ending condition for the game according to the exemplary embodiment has been satisfied. Examples of the ending condition include that the player has performed an ending operation of the game. As a result of this determination, when the determination is YES, the processor 81 ends the game processing, and when the determination is NO, the processor 81 returns to step S2 and repeats the game processing according to the exemplary embodiment. That is, until the game processing ends, the processes from step S2 to step S7 are repeated for each frame, which is the time unit for rendering.

[Posturing Action Process]

Figure 24:
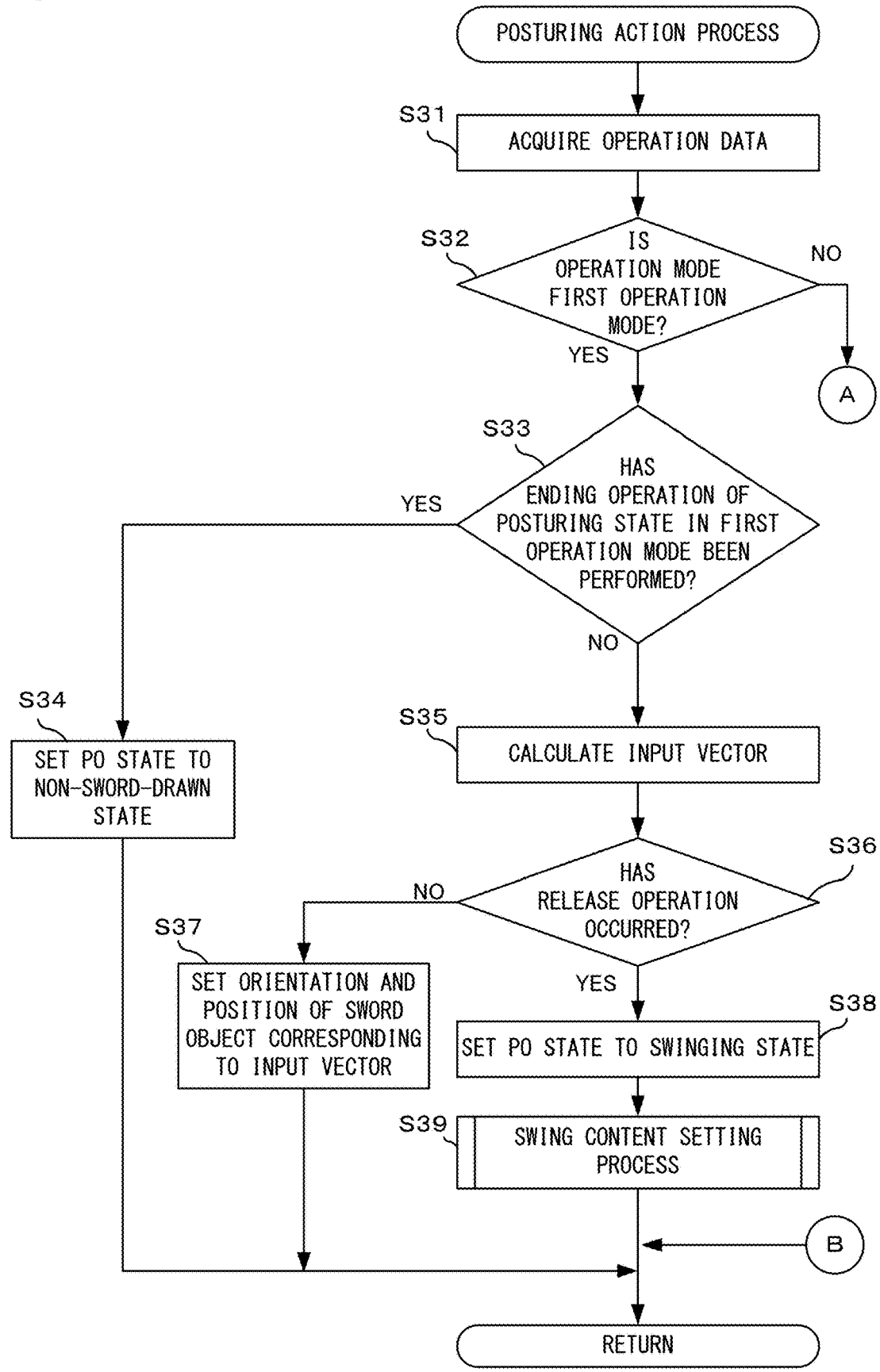
FIG. 24 is a non-limiting example of a flowchart showing details of a posturing action process.
Figure 25:
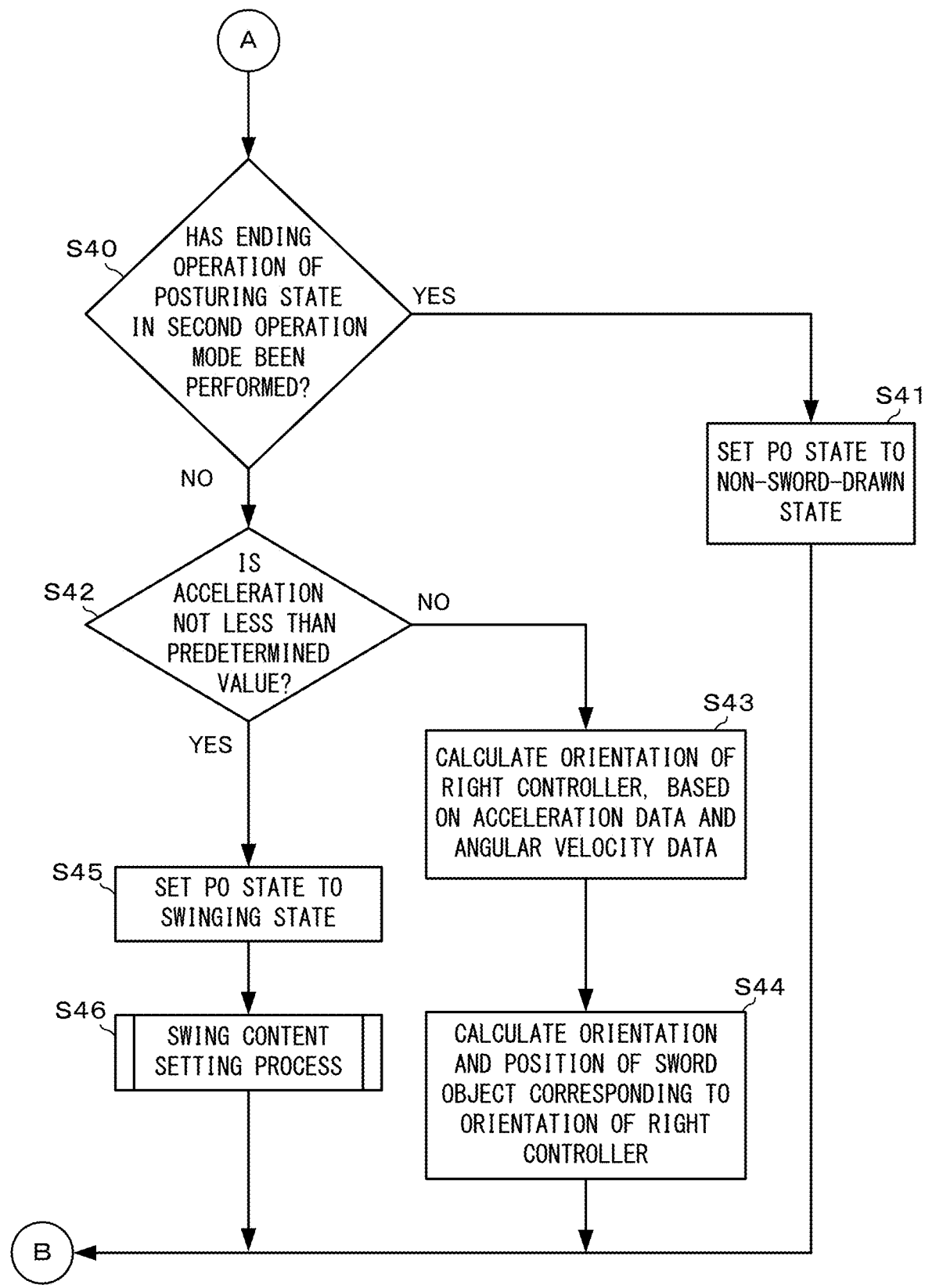
FIG. 25 is a non-limiting example of a flowchart showing details of the posturing action process.

Next, the posturing action process in step S9 is described. Each of FIGS. 24 and 25 is a flowchart showing details of the posturing action process. In FIG. 24, first, in step S31, the processor 81 acquires the operation data 302.

Next, in step S32, the processor 81 determines whether or not the current operation mode is the first operation mode (the operation mode using the right stick 52). As a result of this determination, when the current operation mode is the first operation mode (YES in step S32), the processor 81 determines, in step S33, whether or not an operation (sword sheathing operation) for ending the posturing state in the first operation mode has been performed. In the exemplary embodiment, this ending operation is pressing of a predetermined button. It should be noted that, in the exemplary embodiment, the operation for ending the posturing state is common between the first operation mode and the second operation mode. With respect to this ending operation, when different operations are adopted between the first operation mode and the second operation mode, the operation contents may be determined so as to be suitable for the respective modes.

As a result of the determination above, when the operation for ending the posturing state has been performed (YES in step S33), the processor 81 sets the non-sword-drawn state in the PO state information 308 in step S34. In addition, the processor 81 also performs as appropriate display setting for a sword sheathing motion of putting the sword object 204 into the sheath. Then, the posturing action process ends.

Meanwhile, as a result of the determination in step S33, when the operation for ending the posturing state has not been performed (NO in step S33), the processor 81 next calculates, in step S35, the above-described input vector on the basis of the right analog stick data 304. Next, in step S36, the processor 81 determines whether or not the release operation as described above has occurred, on the basis of the calculated input vector and the release operation determination data 309. That is, whether or not a transition condition to the swinging state has been satisfied is determined. More specifically, the processor 81 determines whether or not the state has changed within three frames, from the state where the input exceeds the swing occurrence threshold 131 as shown in FIG. 19, to the state in which the input is smaller than the release determination threshold 132 as shown in FIG. 20. As a result of the determination, when the release operation has not occurred (NO in step S36), the processor 81 sets, in step S37, an orientation and a position of the sword object 204 on the basis of the input vector calculated in step S35. Accordingly, as the posturing action, the orientation and position of the sword object 204 can be changed in accordance with the direction input of the right stick 52. In a case where the input of the right stick 52 is neutral, a predetermined orientation and a predetermined position corresponding to this case are set. Then, the posturing action process ends.

Meanwhile, as a result of the determination in step S36, when the release operation has occurred (YES in step S36), the processor 81 sets, in step S38, data indicating a swinging state in the PO state information 308.

Figure 26:
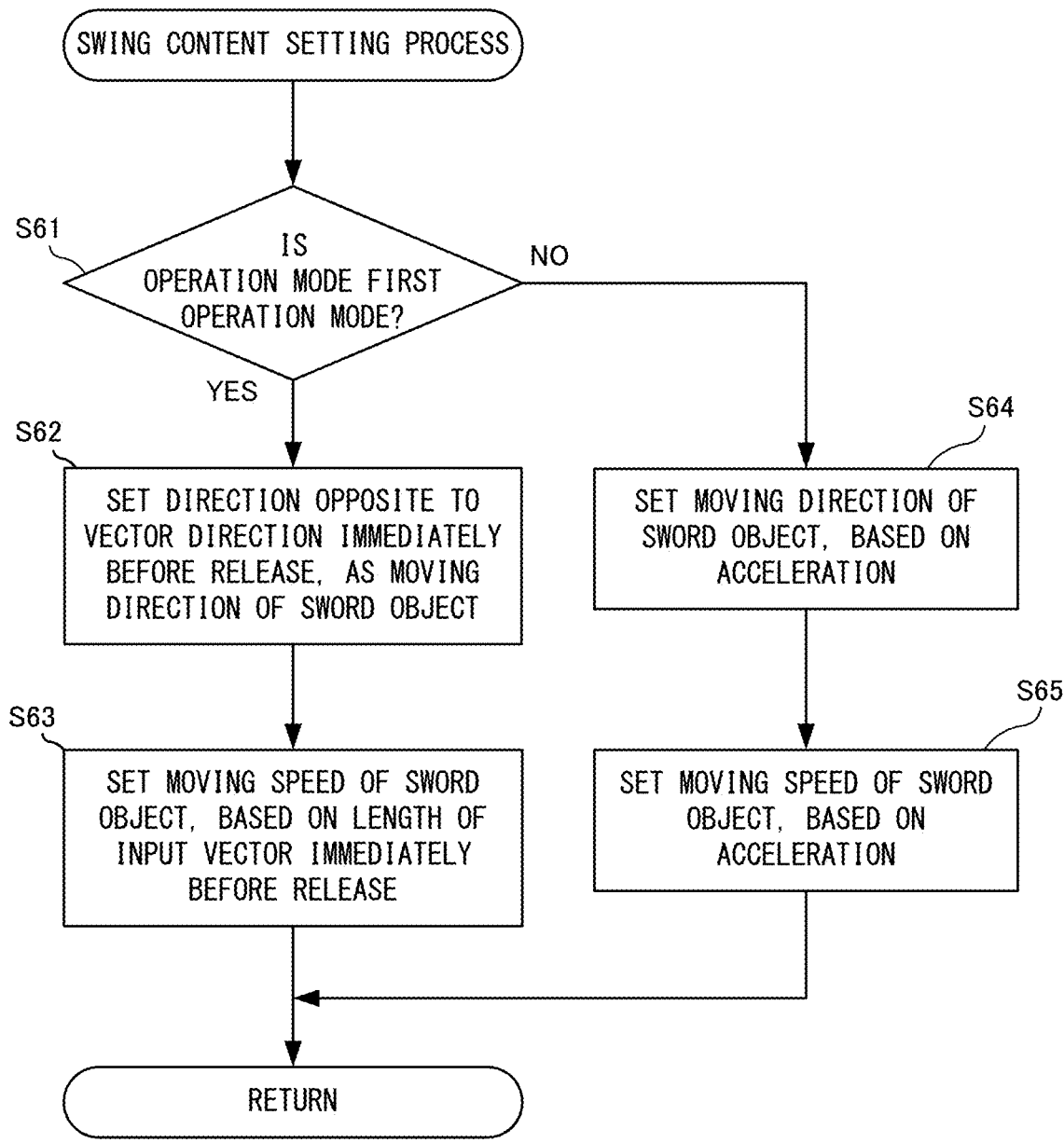
FIG. 26 is a non-limiting example of a flowchart showing details of a swing content setting process.

Next, in step S39, the processor 81 executes a swing content setting process. This process is a process of setting the contents of the sword swing parameters 310. On the basis of the contents set here, change in the orientation and moving of the sword object 204 will be performed in the process regarding the next frame. FIG. 26 is a flowchart showing details of the swing content setting process. In FIG. 26, the processor 81 determines, in step S61, whether or not the operation mode is the first operation mode, on the basis of the operation mode information 307. When the operation mode is the first operation mode (YES in step S61), a process of setting the contents of the sword swing parameters 310 on the basis of the input of the right stick 52 is performed. First, in step S62, the processor 81 sets the moving direction of the sword object 204 on the basis of the calculated input vector. Specifically, the processor 81 calculates a direction opposite to the direction of the input vector that is immediately before the release operation. Then, the processor 81 sets the contents of the sword swing parameters 310 such that the calculated direction indicates the moving direction of the sword object 204.

Next, in step S63, the processor 81 sets the moving direction of the sword object 204 on the basis of the input vector. Specifically, the processor 81 calculates a moving speed on the basis of the length of the input vector that is immediately before the release operation. Then, the processor 81 sets the contents of the sword swing parameters 310 such that the calculated moving speed indicates the moving speed of the sword object 204. That is, the greater the tilt of the right stick 52, the faster the moving speed of the sword object 204 becomes. It should be noted that, in another exemplary embodiment, the moving speed of the sword object 204 in the swinging action in the first operation mode may be a preset fixed speed, irrespective of the length of the input vector. Then, the swing content setting process ends.

Meanwhile, as a result of the determination in step S61, when the operation mode is the second operation mode (NO in step S61), a process of setting the contents of the sword swing parameters 310 on the basis of the inertial sensor data 306 is performed. First, in step S64, the processor 81 calculates the direction in which the right controller 4 has been swung, on the basis of acceleration data included in the inertial sensor data 306. Then, the processor 81 sets the contents of the sword swing parameters 310 such that the calculated direction indicates the moving direction of the sword object 204.

Next, in step S65, the processor 81 calculates the speed at which the right controller 4 has been swung, on the basis of acceleration data included in the inertial sensor data 306. Then, the processor 81 sets the contents of the sword swing parameters 310 such that the calculated speed indicates the moving speed of the sword object 204. Then, the swing content setting process ends.

With reference back to FIG. 24, upon the ending of the swing content setting process, the posturing action process ends.

Next, a case where, as a result of the determination in step S32, the operation mode is the second operation mode (NO in step S32), is described. In this case, in step S40 in FIG. 25, the processor 81 determines whether or not an operation for ending the posturing state in the second operation mode has been performed. In the exemplary embodiment, this ending operation is pressing of a predetermined button as in the case of the first operation mode.

As a result of the determination above, when the operation for ending the posturing state has been performed (YES in step S40), the processor 81 sets, in step S41, the non-sword-drawn state in the PO state information 308. Then, the posturing action process ends.

Meanwhile, as a result of the determination in step S40, when the operation for ending the posturing state has not been performed (NO in step S40), the processor 81 next determines, in step S42, whether or not an acceleration having not less than a predetermined value has occurred, on the basis of the inertial sensor data 306. This predetermined value is a magnitude of acceleration that is sufficient to allow determination of "having swung" the right controller 4. That is, whether or not the right controller 4 has been swung at not less than a predetermined speed is determined. As a result of this determination, when the value of the acceleration is less than the predetermined value (NO in step S42), the processor 81 calculates, in step S43, an orientation of the right controller 4 on the basis of acceleration data and angular velocity data included in the inertial sensor data 306.

Next, in step S44, the processor 81 calculates an orientation and a position of the sword object 204 so as to correspond to the calculated orientation of the right controller 4. Accordingly, the posturing action using the inertial sensors is realized. Then, the posturing action process ends.

Meanwhile, as a result of the determination in step S42, when the value of the acceleration is not less than the predetermined value (YES in step S42), the transition condition from the posturing state to the swinging state in the second operation mode is satisfied. In this case, in step S45, the processor 81 sets the swinging state in the PO state information 308. Then, in step S46, the processor 81 executes a swing content setting process. This process is the same as the process of step S39 described above, and thus, detailed description thereof is omitted. However, in the case of the second operation mode, NO is determined in the determination in step S61, and then the processes thereafter are performed. Then, the posturing action process ends. Upon the ending of the posturing action process, the processing is advanced to step S6.

[Swinging Action Process]

Figure 27:
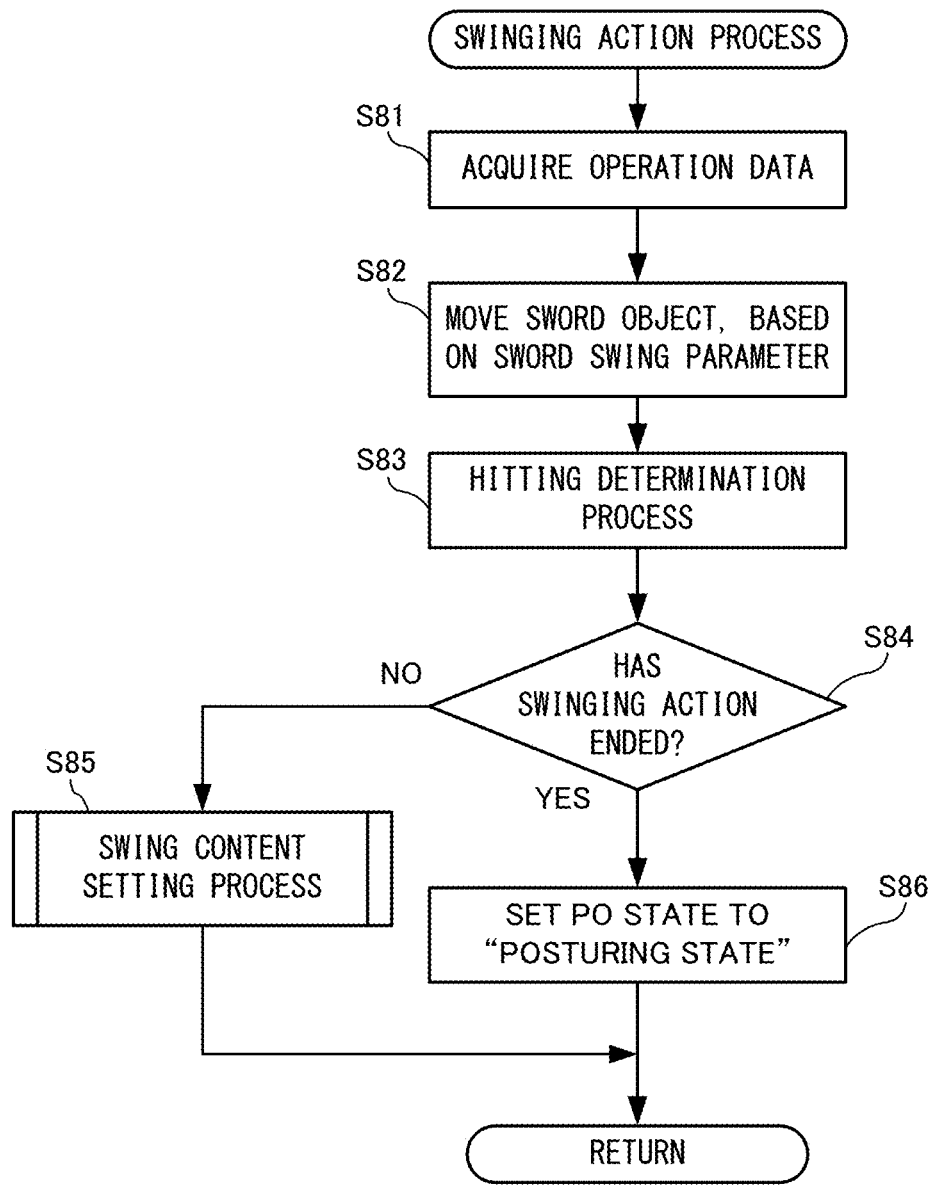
FIG. 27 is a non-limiting example of a flowchart showing details of a swinging action process.

Next, details of the swinging action process in step S10 is described. FIG. 27 is a flowchart showing details of the swinging action process. In FIG. 27, first, in step S81, the processor 81 acquires the operation data 302.

Next, in step S82, on the basis of the contents of the sword swing parameters 310, the processor 81 moves the sword object 204 and, in addition, changes the orientation of the sword object 204.

Next, in step S83, the processor 81 performs a hitting determination process. That is, whether or not the sword object 204 has contacted a predetermined object is determined. The determination result is stored as appropriate in the DRAM 85, and various game processes based on the hitting determination result are executed in other game processes in step S6.

Next, in step S84, the processor 81 determines whether or not the swinging action has ended. For example, whether or not the swinging action (display of the sword swinging motion) has ended is determined on the basis of, for example, whether or not a time corresponding to a predetermined number of frames since the start of the swinging action has elapsed. As a result of this determination, when the swinging action has not ended (NO in step S84), a swing content setting process is executed in step S85. This process is the same as the above-described process in step S39, and thus, detailed description thereof is omitted. Then, the swinging action process ends.

Meanwhile, as a result of the determination in step S84, when the swinging action has ended (YES in step S84), the processor 81 sets, in step S86, data indicating a posturing state in the PO state information 308. Accordingly, transition from the swinging state to the posturing state is performed. Then, the swinging action process ends. Upon the ending of the swinging action process, the processing is advanced to step S6.

This is the end of detailed description of the game processing according to the exemplary embodiment.

As described above, in the exemplary embodiment, a series of actions comprising "posturing" and "swinging" of the sword object 204 can be performed through a simple operation of direction input of the analog stick. In addition, due to the operation method in which "swinging" is executed by canceling the direction input of the analog stick, the timing and direction of the swinging can be easily determined. Further, the series of the above-described actions based on the motion and orientation of the controller itself using the inertial sensors can also be performed. In this case, whether the analog stick operation or the operation based on the inertial sensors is used, a common action, which is an action comprising "posturing" and "swinging" of the sword object 204, can be realized. Accordingly, the player can be provided with a variety of operation methods for the same action, whereby the convenience for the player can be enhanced.

[Modification]

In the example in the above exemplary embodiment, at the time of release operation, a direction opposite to the input direction of the right stick is set as the direction in which the sword object is swung. In another exemplary embodiment, with respect to the direction in which the sword is swung, the sword object 204 may be swung in a predetermined direction, not limited to such an opposite direction. For example, a specific direction is set in advance as the direction in which the sword is swung, and when the above-described release operation has been performed, the sword may always be swung in this specific direction, irrespective of the input direction at that time.

In the example in the above exemplary embodiment, with respect to the posturing action, when a release operation is performed while an input exceeding the swing occurrence threshold 131 shown in FIG. 19 has occurred, a swinging action is performed. Further, in this example, even when there is a direction input not exceeding the swing occurrence threshold 131, the posturing action itself can be performed. In another exemplary embodiment, only when a direction input exceeding the swing occurrence threshold 131 has been provided may the posturing action be performed. In this case, even when the direction input has been provided, if the direction input does not exceed the swing occurrence threshold 131 (e.g., an input in a range of not less than the release determination threshold 132 and less than the swing occurrence threshold 131), the posturing action as described above may be prevented from being performed. In this case, a state where "sword drawing has been performed but posturing is not performed" is added between the "non-sword-drawn state" and the "posturing state". Further, in this state, although the player object 201 is not in the posture of holding the sword, the position and orientation of the sword may be changed in accordance with the input content. Conversely, in this state, without changing the position and orientation of the sword corresponding to the input content, the sword object 204 may be fixed to a position and an orientation defined as a default for sword drawing, for example.

Further, in the example in the above exemplary embodiment, with respect to the release operation, when the input state exceeding the swing occurrence threshold 131 has changed, within a predetermined time, to an input state not exceeding the release determination threshold 132, the swinging action is performed. The method for determining the release operation is not limited thereto, and cancelation of the direction input may be determined by another method. Then, when cancelation of the direction input has occurred, the swinging action may be performed.

In the above exemplary embodiment, while the swinging action is performed in the first operation mode, an operation regarding the sword object 204 is not substantially received until the swinging action ends. Not limited to this, in another exemplary embodiment, the next operation may be received during the swinging action. For example, a case in which it takes a time corresponding to 10 frames from the start of the swinging action to the end thereof is assumed. In this case, a configuration may be adopted in which an operation regarding the sword object 204 is not received from the start to the 120th frame but the operation is received after the 120th frame. This makes it possible to provide the player with an operation in which the motion of swinging the sword by the player object 201 is canceled during the motion, and the next posturing action to swinging action are caused to be performed. Therefore, a greater variety of play can be provided to the player, and the entertainment characteristics of the game can be enhanced.

In the example in the above exemplary embodiment, the analog stick is used in the first operation mode. The input device is not limited to the analog stick. The above processes can be applied also when using an analog-input-type direction input device that realizes a predetermined neutral position when there is no input. For example, the above processes can be applied to a slide pad or the like.

In the example in the above exemplary embodiment, a case where the sword object 204 is swung is described. However, the above processes can be applied also when a weapon object of another type is used as long as the weapon is one that is to be swung while being held with a hand. For example, the weapon may be a club, an ax, or the like.

Further, the processes in the first operation mode can be applied, not only when using an analog-type input device but also when using a digital-type direction input button capable of providing up, down, left, and right direction inputs, for example. In this case, as the release operation, instead of various thresholds as described above, a timing at which the direction input is switched from ON to OFF may be used. Then, the swinging action may be performed such that the sword is swung in a direction opposite to the inputted direction, or a predetermined direction other than the opposite direction.

In the above exemplary embodiment, a case in which a series of processes regarding the game processing are executed in a single apparatus has been described. However, in another exemplary embodiment, the series of processes may be executed in an information processing system including a plurality of information processing apparatuses. For example, in an information processing system including a terminal-side apparatus and a server-side apparatus communicable with the terminal-side apparatus via a network, some of the series of processes above may be executed by the server-side apparatus. Further, in an information processing system including a terminal-side apparatus and a server-side apparatus communicable with the terminal-side apparatus via a network, major processes among the series of processes above may be executed by the server-side apparatus, and some of the processes may be executed in the terminal-side apparatus. Further, in the above information processing system, the system on the server side may be implemented by a plurality of information processing apparatuses, and processes that should be executed on the server side may be shared and executed by a plurality of information processing apparatuses. Further, a configuration of a so-called cloud gaming may be adopted. For example, a configuration may be adopted in which: the main body apparatus 2 sends operation data indicating operations performed by the player to a predetermined server; various game processes are executed in the server; and the execution result is streaming-distributed as a moving image/sound to the main body apparatus 2.

While the exemplary embodiment has been described in detail, the foregoing description is in all aspects illustrative and not restrictive. It is to be understood that various modifications and variations can be made without departing from the scope of the exemplary embodiment.

What is claimed is:

1. A computer-readable non-transitory storage medium having stored therein instructions that, when executed by a processor of an information processing system, cause the processor to:
   control, in a virtual space, a player object having an item object;
   cause, based on a first direction input performed on an operation device, the player object to perform a posturing action of holding the item object in an orientation corresponding to an input direction according to the first direction input; and
   cause, in accordance with cancelation of the first direction input, the player object to perform a swinging action of swinging the item object wherein the swinging action causes the player object to swing the item object from a direction in which the player object holds the item object in the posturing action toward an opposite direction.

2. The storage medium according to claim 1, wherein the instructions further cause the processor to perform game processing including a success determination process based on the direction in which the item object is swung in the swinging action.

3. The storage medium according to claim 1, wherein the operation device includes a first stick for providing a first direction input, and outputs direction input data corresponding to a tilt of the first stick, and
   the instructions further cause the processor to:
   cause the player object to perform the posturing action in accordance with a tilting direction of the first stick while a tilting degree of the first stick exceeds a first reference; and
   cause, when a state where the tilting degree exceeds the first reference has transitioned to a state where the tilting degree does not exceed a second reference, the player object to perform the swinging action, assuming that the cancelation of the first direction input has been performed.

4. The storage medium according to claim 3, wherein the second reference is a tilting degree smaller than the first reference, and
   when the state where the tilting degree exceeds the first reference has changed to the state where the tilting degree does not exceed the second reference within a predetermined time, the swinging action is caused to be performed, assuming that the cancelation of the first direction input has been performed.

5. The storage medium according to claim 4, wherein when the tilting degree is between the first reference and the second reference, the instructions further cause the processor to cause the player object to perform an action of moving the item object, on the basis of the tilting degree and the tilting direction.

6. The storage medium according to claim 1, wherein the operation device further includes a second stick for providing a second direction input, and outputs direction input data corresponding to a tilt of the second stick, and
the instructions further cause the processor to move the player object in the virtual space on the basis of the second direction input.

7. The storage medium according to claim 1, wherein the operation device further includes an inertial sensor, and
the instructions further cause the processor to:
   in a first operation mode, cause the player object to perform the posturing action and the swinging action on the basis of the first direction input; and
   in a second operation mode,
      cause the player object to perform the posturing action on the basis of an orientation of the operation device, and
      cause the player object to perform the swinging action on the basis of a swing input performed on the operation device.

8. The storage medium according to claim 1, wherein the item object is a weapon object for attacking an enemy object by the swinging action.

9. The storage medium according to claim 1, wherein the instructions further cause the processor to,
   while an input on the operation device other than the first direction input is performed together with the first direction input, control a virtual camera on the basis of the first direction input, without causing the player object to perform the posturing action and the swinging action.

10. A game apparatus comprising at least one processor, the processor being configured to:
    control, in a virtual space, a player object having an item object;
    cause, based on data indicating a first direction input which has been performed on and outputted from an operation device capable of providing a direction input, the player object to perform a posturing action of holding the item object in an orientation corresponding to an input direction according to the first direction input; and
    cause, in accordance with data indicating cancelation of the first direction input outputted from the operation device, the player object to perform a swinging action of swinging the item object wherein the swinging action causes the player object to swing the item object from a direction in which the player object holds the item object in the posturing action toward an opposite direction.

11. The game apparatus according to claim 10, wherein the operation device includes a first stick for providing a first direction input, and
    the processor
    acquires direction input data corresponding to a tilt of the first stick and outputted from the operation device,
    causes the player object to perform the posturing action in accordance with a tilting direction of the first stick while a tilting degree of the first stick exceeds a first reference, and
    causes, when a state where the tilting degree exceeds the first reference has transitioned to a state where the tilting degree does not exceed a second reference, the player object to perform the swinging action, assuming that the cancelation of the first direction input has been performed.

12. The game apparatus according to claim 10, wherein the operation device further includes a second stick for providing a second direction input, and the processor
    acquires direction input data corresponding to a tilt of the second stick and outputted from the operation device, and
    moves the player object in the virtual space on the basis of the second direction input.

13. A game system comprising at least one processor, the processor being configured to:
    control, in a virtual space, a player object having an item object;
    cause, based on a first direction input performed on an operation device capable of providing a direction input, the player object to perform a posturing action of holding the item object in an orientation corresponding to an input direction according to the first direction input; and
    cause, in accordance with cancelation of the first direction input, the player object to perform a swinging action of swinging the item object wherein the swinging action causes the player object to swing the item object from a direction in which the player object holds the item object in the posturing action toward an opposite direction.

14. The game system according to claim 13, wherein
the processor further performs game processing including a success determination process based on the direction in which the item object is swung in the swinging action.

15. The game system according to claim 13, wherein
the operation device includes a first stick for providing a first direction input, and outputs direction input data corresponding to a tilt of the first stick, and
the processor further
    causes the player object to perform the posturing action in accordance with a tilting direction of the first stick while a tilting degree of the first stick exceeds a first reference, and
    causes, when a state where the tilting degree exceeds the first reference has transitioned to a state where the tilting degree does not exceed a second reference, the player object to perform the swinging action, assuming that the cancelation of the first direction input has been performed.

16. The game system according to claim 15, wherein
the second reference is a tilting degree smaller than the first reference, and
when the state where the tilting degree exceeds the first reference has changed to the state where the tilting degree does not exceed the second reference within a predetermined time, the processor causes the player object to perform the swinging action, assuming that the cancelation of the first direction input has been performed.

17. The game system according to claim 16, wherein
when the tilting degree is between the first reference and the second reference, the processor further causes the player object to perform an action of moving the item object, on the basis of the tilting degree and the tilting direction.

18. The game system according to claim 13, wherein
the operation device further includes a second stick for providing a second direction input, and outputs direction input data corresponding to a tilt of the second stick, and
the processor further moves the player object in the virtual space on the basis of the second direction input.

19. The game system according to claim 13, wherein
the operation device further includes an inertial sensor, and
the processor further,
    in a first operation mode, causes the player object to perform the posturing action and the swinging action on the basis of the first direction input, and
    in a second operation mode,
        causes the player object to perform the posturing action on the basis of an orientation of the operation device, and
        causes the player object to perform the swinging action on the basis of a swing input performed on the operation device.

20. The game system according to claim 19, wherein
the game system includes the operation device and a main body apparatus which the operation device is attachable to and detachable from,
when the operation device is in a state of being attached to the main body apparatus, only the first operation mode is usable, and
when the operation device is in a state of not being attached to the main body apparatus, the first operation mode and the second operation mode are switchable with each other.

21. The game system according to claim 13, wherein
the item object is a weapon object for attacking an enemy object by the swinging action.

22. The game system according to claim 13, wherein
while an input on the operation device other than the first direction input is performed together with the first direction input, the processor further controls a virtual camera on the basis of the first direction input, without causing the player object to perform the posturing action and the swinging action.

23. A game processing method executed by a processor configured to control an information processing system, the game processing method causing the processor to:
    control, in a virtual space, a player object having an item object;
    cause, based on a first direction input performed on an operation device capable of providing a direction input, the player object to perform a posturing action of holding the item object in an orientation corresponding to an input direction according to the first direction input; and
    cause, in accordance with cancelation of the first direction input, the player object to perform a swinging action of swinging the item object wherein the swinging action causes the player object to swing the item object from a direction in which the player object holds the item object in the posturing action toward an opposite direction.

24. The game processing method according to claim 23, wherein
the operation device includes a first stick for providing a first direction input, and outputs direction input data corresponding to a tilt of the first stick, and
the processor further
    causes the player object to perform the posturing action in accordance with a tilting direction of the first stick while a tilting degree of the first stick exceeds a first reference, and
    causes, when a state where the tilting degree exceeds the first reference has transitioned to a state where the tilting degree does not exceed a second reference, the player object to perform the swinging action, assuming that the cancelation of the first direction input has been performed.

25. The game processing method according to claim 23, wherein
the operation device further includes a second stick for providing a second direction input, and outputs direction input data corresponding to a tilt of the second stick, and
the processor further moves the player object in the virtual space on the basis of the second direction input.

* * * * *